United States Patent
Koike et al.

(10) Patent No.: US 12,242,103 B2
(45) Date of Patent: Mar. 4, 2025

(54) BATCH-MOLDING MULTI OPTICAL TRANSMISSION SHEET ASSEMBLY, CONNECTION STRUCTURE, OPTICAL MODULE, ACTIVE OPTICAL CABLE, AND MANUFACTURING METHOD THEREOF

(71) Applicant: Yasuhiro Koike, Yokohama (JP)

(72) Inventors: Yasuhiro Koike, Kanagawa (JP); Hiroshi Takizuka, Tokyo (JP)

(73) Assignee: Yasuhiro Koike, Yokohama (JP)

( * ) Notice: Subject to any disclaimer, the term of this patent is extended or adjusted under 35 U.S.C. 154(b) by 0 days.

(21) Appl. No.: 17/641,371

(22) PCT Filed: Sep. 9, 2020

(86) PCT No.: PCT/JP2020/034159
§ 371 (c)(1),
(2) Date: Mar. 8, 2022

(87) PCT Pub. No.: WO2021/049540
PCT Pub. Date: Mar. 18, 2021

(65) Prior Publication Data
US 2023/0367059 A1 Nov. 16, 2023

(30) Foreign Application Priority Data
Sep. 13, 2019 (JP) .................. 2019-167786

(51) Int. Cl.
*G02B 6/02* (2006.01)
*G02B 6/38* (2006.01)

(52) U.S. Cl.
CPC ..... *G02B 6/02042* (2013.01); *G02B 6/02033* (2013.01); *G02B 6/3885* (2013.01); *G02B 6/3889* (2013.01)

(58) Field of Classification Search
CPC .................................. G02B 6/02; G02B 6/38
(Continued)

(56) References Cited

U.S. PATENT DOCUMENTS 6,799,900 B2    10/2004  Shiino et al.
7,197,221 B2 *  3/2007   Ohtsu .................. G02B 6/1221
                                                        385/14
(Continued)

FOREIGN PATENT DOCUMENTS

CN          1886258 A      12/2006
CN       101529294 A       9/2009
(Continued)

OTHER PUBLICATIONS

Taiwanese Office Action issued Nov. 7, 2023 in Taiwanese Patent Application No. 109131316, citing references 1 and 15 therein, 13 pages.
(Continued)

*Primary Examiner* — Kaveh C Kianni
(74) *Attorney, Agent, or Firm* — Oblon, McClelland, Maier & Neustadt, L.L.P.

(57) ABSTRACT

A batch-molding multi optical transmission sheet assembly includes a batch-molding multi optical transmission sheet, a housing member, and a fixing element. The batch-molding multi optical transmission sheet includes a sheet-like covering part made of plastic, and a plurality of optical transmission regions, inside the covering part, including a core region made of plastic that is disposed to extend along an extending direction of the covering part and a clad region made of plastic that surrounds an outer circumference of the core region, the optical transmission regions being arranged in a line in substantially parallel with each other along a principal surface of the covering part. The housing member includes a disposition hole in which at least one end part of the batch-molding multi optical transmission sheet is housed. The fixing element fixes the batch-molding multi optical transmission sheet and the housing member.

17 Claims, 36 Drawing Sheets

(58) Field of Classification Search
USPC ....................................................... 385/126
See application file for complete search history.

(56) References Cited

U.S. PATENT DOCUMENTS

| | | | |
|---|---|---|---|
| 8,876,401 B2 | 11/2014 | Shiraishi | |
| 9,110,254 B2 | 8/2015 | Dangel et al. | |
| 9,423,572 B2 | 8/2016 | Akabane et al. | |
| 9,891,391 B2* | 2/2018 | Watanabe | G02B 6/3887 |
| 2003/0190130 A1 | 10/2003 | Welker et al. | |
| 2005/0062181 A1 | 3/2005 | Walker | |
| 2011/0227487 A1* | 9/2011 | Nichol | G02B 6/0018 362/613 |
| 2011/0255303 A1* | 10/2011 | Nichol | G02B 6/0088 362/606 |
| 2011/0273906 A1* | 11/2011 | Nichol | G02B 6/0028 445/24 |
| 2011/0277361 A1* | 11/2011 | Nichol | G02B 6/0028 40/541 |
| 2013/0155723 A1* | 6/2013 | Coleman | G02B 6/0075 362/621 |
| 2014/0049983 A1* | 2/2014 | Nichol | G02B 6/0028 362/610 |
| 2014/0056028 A1* | 2/2014 | Nichol | G02B 6/0015 362/616 |
| 2014/0193119 A1 | 7/2014 | Isenhour et al. | |
| 2017/0160500 A1 | 6/2017 | Zhao et al. | |
| 2021/0011214 A1 | 1/2021 | Koike | |
| 2021/0181405 A1* | 6/2021 | Nichol | G02B 6/0016 |

FOREIGN PATENT DOCUMENTS

| | | | | |
|---|---|---|---|---|
| JP | H05241036 A | * | 9/1993 | |
| JP | 2000-81544 A | | 3/2000 | |
| JP | 2000-275463 A | | 10/2000 | |
| JP | 2002-107578 A | | 4/2002 | |
| JP | 2002-243985 A | | 8/2002 | |
| JP | 2003-131077 A | | 5/2003 | |
| JP | 2005286225 A | * | 10/2005 | ........... G02B 6/4201 |
| JP | 2006-139209 A | | 6/2006 | |
| JP | 2006-221031 A | | 8/2006 | |
| JP | 2010-266826 A | | 11/2010 | |
| JP | 2012-520480 A | | 9/2012 | |
| JP | 2013-20027 A | | 1/2013 | |
| JP | 2015-87636 A | | 5/2015 | |
| JP | 2015-155969 A | | 8/2015 | |
| JP | 2019-049658 A | | 3/2019 | |
| TW | 201307929 A1 | | 2/2013 | |
| WO | WO 2005/037544 A1 | | 4/2005 | |
| WO | WO 2008/032724 A1 | | 3/2008 | |
| WO | WO 2019/177068 A1 | | 9/2019 | |

OTHER PUBLICATIONS

International Search report issued Dec. 8, 2020 in PCT/JP2020/034159, filed on Sep. 9, 2020, citing documents AA, AC & AI-AU therein, 3 pages.

Combined Taiwanese Office Action and Search Report issued Jun. 11, 2024 in Taiwanese Patent Application No. 109131316 (with unedited computer-generated English translation), citing document 15 therein, 8 pages.

Japanese Office Action issued Apr. 2, 2024 in Japanese Patent Application No. 2019-167786 (with unedited computer-generated English translation), citing documents 15-16 therein, 7 pages.

Combined Chinese Office Action and Search Report issued May 31, 2024 in Chinese Patent Application No. 202080061557 (with unedited computer-generated English translation), citing documents 17-18 therein, 21 pages.

Office Action dated Sep. 3, 2024, issued in counterpart JP Application No. 2019-167786, w/English Translation, (8 pages).

* cited by examiner

FIG.6A
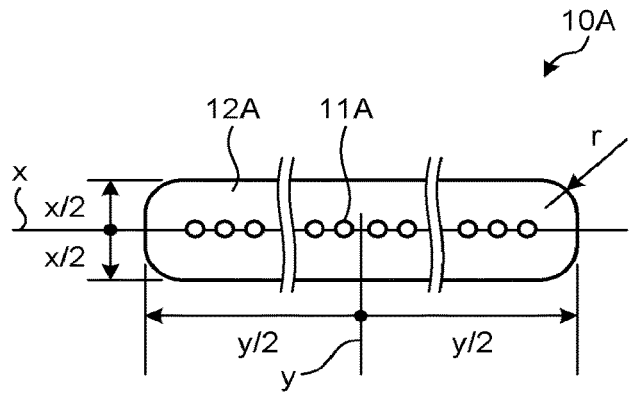
FIG.6B
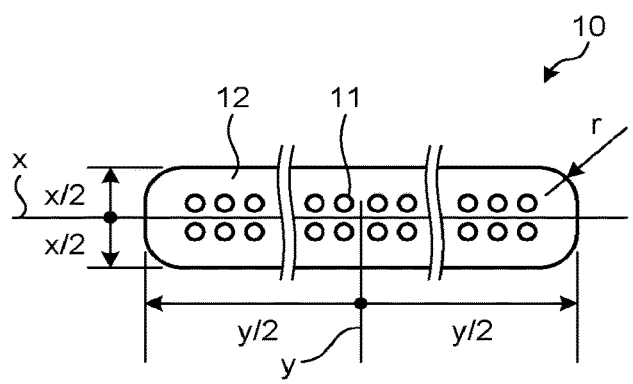
FIG.6C
[UNIT: μm]
| NUMBER OF CORES | NUMBER OF ROWS | y min | y max | x min | x max | r max |
|---|---|---|---|---|---|---|
| 4 | 1 | 0.875 | 3.900 | 0.125 | 2.540 | R1.270 |
| 8 | 1 | 1.875 | 3.900 | 0.125 | 2.540 | R1.270 |
| 10 | 1 | 2.375 | 3.900 | 0.125 | 2.540 | R1.270 |
| 12 | 1 | 2.875 | 3.900 | 0.125 | 2.540 | R1.270 |
| 16 | 1 | 3.875 | 4.750 | 0.125 | 2.540 | R1.270 |
| 8 | 2 | 0.875 | 3.900 | 0.625 | 2.540 | R1.270 |
| 16 | 2 | 1.875 | 3.900 | 0.625 | 2.540 | R1.270 |
| 20 | 2 | 2.375 | 3.900 | 0.625 | 2.540 | R1.270 |
| 24 | 2 | 2.875 | 3.900 | 0.625 | 2.540 | R1.270 |
| 32 | 2 | 3.875 | 4.750 | 0.625 | 2.540 | R1.270 |

BATCH-MOLDING MULTI OPTICAL TRANSMISSION SHEET ASSEMBLY, CONNECTION STRUCTURE, OPTICAL MODULE, ACTIVE OPTICAL CABLE, AND MANUFACTURING METHOD THEREOF

FIELD

The present invention relates to a batch-molding multi optical transmission sheet assembly, a connection structure, an optical module, an active optical cable, and a manufacturing method thereof.

BACKGROUND

In a case of using a conventional optical fiber for an optical communication system, the optical fiber has been used in a state of a tape core in some cases. The tape core has a structure in which a plurality of, for example, four optical fibers are arranged in parallel in a planar shape, an outer circumference thereof is collectively surrounded and covered by a resin tape layer, and an outer circumference thereof is further collectively surrounded and covered by a batch covering layer. Such a tape core includes an MT connector attached to an end thereof, and is connected to an appliance or another tape core.

To connect the conventional tape core to another optical element (including another tape core) such as an optical component or an optical appliance, at the time of attaching the MT connector thereto, for example, required is work of removing the resin tape layer and the batch covering layer to extract the optical fibers, and inserting the optical fibers into respective holes formed on a connector housing of the MT connector one by one. Thus, there has been the problem that attachment of the MT connector is complicated, and it takes long time for the work.

CITATION LIST

Patent Literature

Patent Literature 1: WO 2019/177068

SUMMARY

Technical Problem

On the other hand, the present inventors have invented a batch-molding multi optical transmission sheet and a batch-molding multi optical transmission sheet connector that are completely different from the conventional optical fiber, can implement high-speed signal transmission with short distance and high quality, and have high workability at the time of being connected to another optical element (Patent Literature 1).

The present invention has been made in view of such a situation, and an objective is to provide a batch-molding multi optical transmission sheet assembly that can be manufactured more easily, a connection structure using the batch-molding multi optical transmission sheet assembly, an optical module, an active optical cable, and a manufacturing method thereof.

Solution to Problem

To resolve the above object and attain the object, a batch-molding multi optical transmission sheet assembly according to an embodiment of the present invention includes: a batch-molding multi optical transmission sheet including a sheet-like covering part made of plastic, and a plurality of optical transmission regions, inside the covering part, including a core region made of plastic that is disposed to extend along an extending direction of the covering part and a clad region made of plastic that surrounds an outer circumference of the core region, the optical transmission regions being arranged in a line in substantially parallel with each other along a principal surface of the covering part; a housing member including a disposition hole in which at least one end part of the batch-molding multi optical transmission sheet is housed; and a fixing means for fixing the batch-molding multi optical transmission sheet to the housing member.

An optical module according to an embodiment of the present invention includes: the batch-molding multi optical transmission sheet assembly; and a photoelectric element optically connected to the batch-molding multi optical transmission sheet.

An active optical cable according to an embodiment of the present invention includes: the optical module; an electric circuit electrically connected to the photoelectric element; and a connector electrically connected to the electric circuit.

A connection structure according to an embodiment of the present invention includes: two batch-molding multi optical transmission sheet assemblies. Further, the housing members of the two batch-molding multi optical transmission sheet assemblies are connected to each other.

A manufacturing method for a batch-molding multi optical transmission sheet assembly according to an embodiment of the present invention includes: a housing step of housing, in a disposition hole of a housing member, one end part of a batch-molding multi optical transmission sheet including: a sheet-like covering part made of plastic; and a plurality of optical transmission regions, inside the covering part, including a core region made of plastic that is disposed to extend along an extending direction of the covering part and a clad region made of plastic that surrounds an outer circumference of the core region, the optical transmission regions being arranged in a line in substantially parallel with each other along a principal surface of the covering part; and a fixing step of fixing the batch-molding multi optical transmission sheet and the housing member.

Advantageous Effects of Invention

According to the present invention, the effects that the batch-molding multi optical transmission sheet assembly that can be manufactured more easily, the connection structure, the optical module, and the active optical cable can be exerted.

BRIEF DESCRIPTION OF DRAWINGS

FIG. 6A is a diagram illustrating a size of the multi optical transmission sheet and a disposition example of optical transmission regions.

FIG. 6B is a diagram illustrating the size of the multi optical transmission sheet and a disposition example of the optical transmission regions.

FIG. 6C is a table indicating a minimum value of y, a maximum value of y, a minimum value of x, a maximum value of x, and a maximum value of r corresponding to each combination of the number of cores and the number of rows in the multi optical transmission sheet.

DESCRIPTION OF EMBODIMENTS

Figure 1:
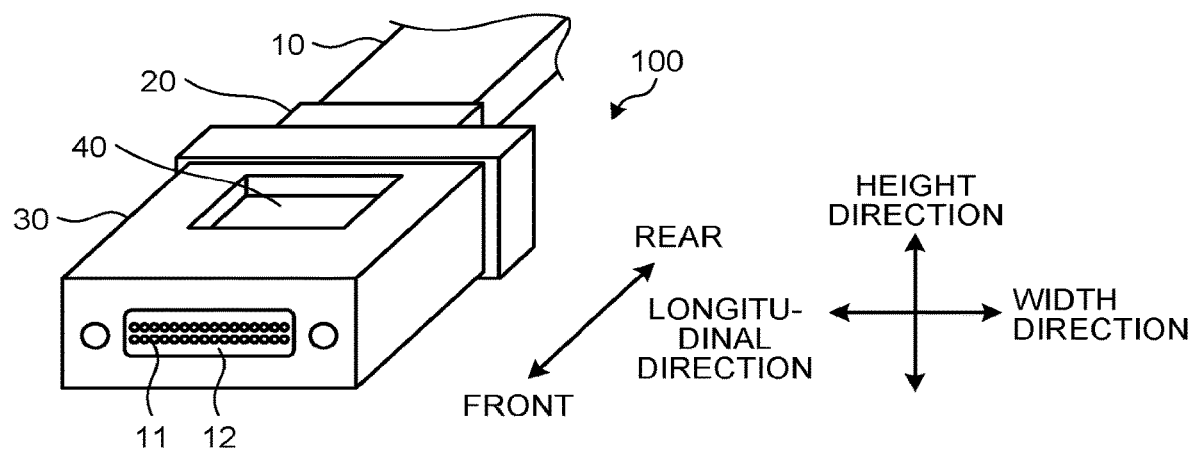
FIG. 1 is a schematic perspective view of a multi optical transmission sheet cable with a ferrule according to a first embodiment.

The following describes embodiments of the present invention in detail with reference to the drawings. The present invention is not limited to the embodiments. Throughout the drawings, the same or corresponding elements are denoted by the same reference numeral as appropriate. The drawings are schematic only, and it should be noted that a dimensional relation or the like among elements may be different from real ones. Dimensional relations and ratios may be different among the drawings.

First Embodiment

Figure 2A:
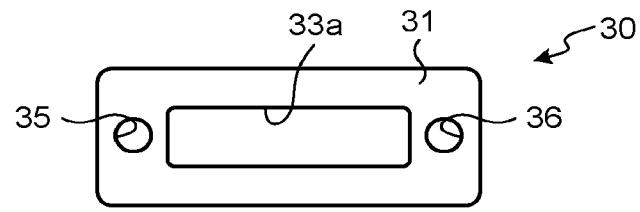
FIG. 2A is a front view illustrating a configuration of the ferrule illustrated in FIG. 1.

FIG. 1 is a schematic perspective view of a multi optical transmission sheet cable with a ferrule according to a first embodiment. A cable 100 as a multi optical transmission sheet cable with a ferrule is an example of a batch-molding multi optical transmission sheet assembly. The cable 100 includes a multi optical transmission sheet 10 as a batch-molding multi optical transmission sheet, a boot 20, a ferrule 30 as a housing member, and an instant adhesive 40 as an adhesive as an example of a fixing means. In FIG. 1, a longitudinal direction, a height direction, and a width direction are defined by arrows, and this definition of directions are appropriately used in FIG. 2A and the following drawings.

The multi optical transmission sheet 10 includes a plurality of optical transmission regions 11 and a covering part 12 similar to the batch-molding multi optical transmission sheet disclosed in Patent Literature 1. The optical transmission regions 11 are disposed inside the covering part 12. The multi optical transmission sheet 10 in FIG. 1 includes 32 cores, and the number of the optical transmission regions 11 is 32. However, the number of the optical transmission regions 11 is not limited. In the multi optical transmission sheet 10, all of the optical transmission regions 11 have the same configuration, but one or more of the optical transmission regions 11 may have different configurations.

The covering part 12 is made of plastic, has a sheet-like shape, and extends in the longitudinal direction (extending direction). The optical transmission regions 11 are disposed to extend along the extending direction, and are arranged in a line in parallel with each other along a principal surface of the covering part 12. However, the optical transmission regions 11 may be arranged in substantially parallel with each other so long as the accuracy is within a permissible accuracy range. A cross section of the covering part 12 has rounded corners, for example.

The optical transmission region 11 includes a core region made of plastic and having a circular cross section, and a clad region made of plastic and having a circular cross section surrounding an outer circumference of the core region. The core region and the clad region are substantially coaxially formed.

The core region has refractive index distribution of graded index (GI) type (for example, square distribution), and the clad region has a lower refractive index than that of the core region. The optical transmission region has such refractive index distribution, so that, at the time when light is propagated in a multimode, light is propagated in a linear shape in a base mode, and light is propagated in a sine wave shape in a higher order mode. As a result, the optical transmission region 11 can suppress a propagation speed difference between modes, and can transmit pulsed light with little distortion. A diameter of the core region is 50 µm or 62 µm, for example, but is not limited. Furthermore, the diameter of the core region can be controlled to be equal to or smaller than 10 µm, for example, and can be configured to satisfy a single mode condition. There is no limitation on further disposing a layer having a lower refractive index than that of the clad region outside the clad region, that is, giving what is called a double clad structure.

The optical transmission regions 11 are arranged at regular intervals. Herein, a distance between the optical transmission regions 11 is a distance between center axes of adjacent core regions. However, the optical transmission regions 11 are not necessarily arranged at accurately regular intervals but may be arranged at substantially regular intervals in a permissible accuracy range. Furthermore, it is easy to intentionally design the distance between the optical transmission regions 11.

Roundness of the core region or the clad region, and a shape of the covering part 12 can be implemented with accuracy equal to or smaller than several micrometers with respect to design.

The boot 20 is a member made of rubber, for example, for preventing the multi optical transmission sheet 10 from being excessively bent by the ferrule 30.

Figure 2B:
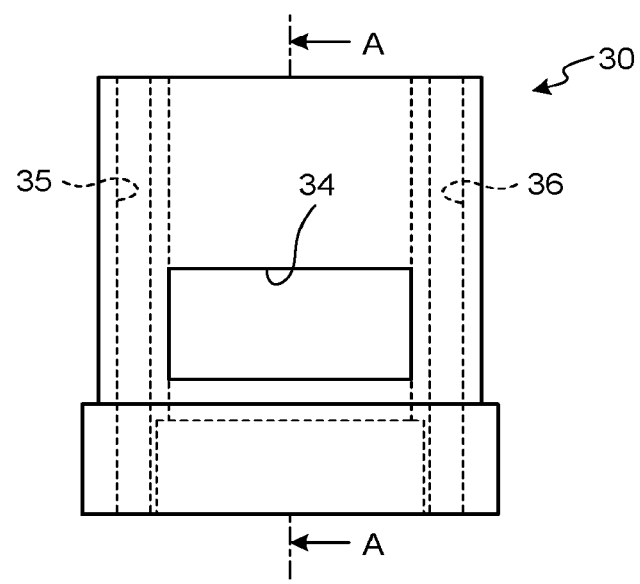
FIG. 2B is a plan view illustrating a configuration of the ferrule illustrated in FIG. 1.
Figure 2C:
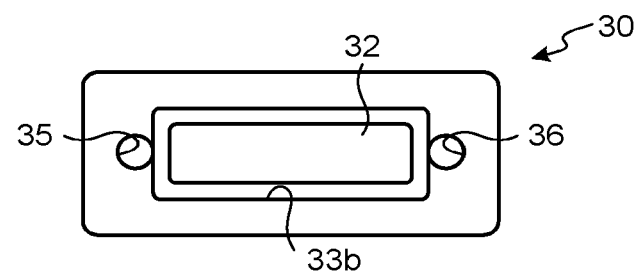
FIG. 2C is a back view illustrating a configuration of the ferrule illustrated in FIG. 1.
Figure 2D:
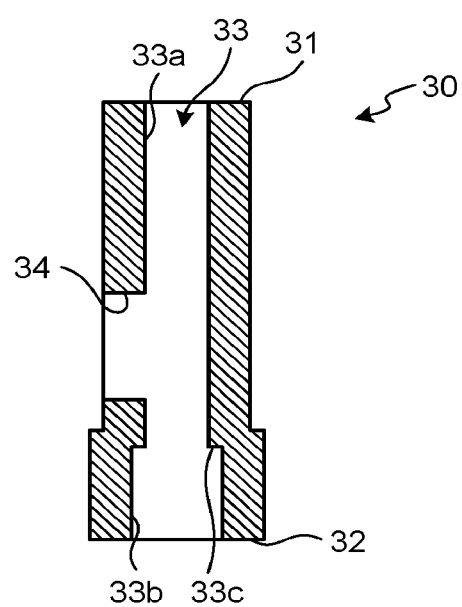
FIG. 2D is a sectional view along line A-A of FIG. 2B.

FIGS. 2A, 2B, 2C, and 2D are a front view, a plan view, and a back view of the ferrule, and a sectional view along line A-A of FIG. 2B, respectively. The ferrule 30 is a ferrule that is interchangeable with an MT ferrule, and includes a front end surface 31, a rear end surface 32, a disposition hole 33, a communication hole 34, and guide holes 35 and 36. Herein, the MT ferrule conforms to, for example, JIS C5981 standard related to an F12 type multicore optical fiber connector or IEC61754-5 standard. The ferrule 30 is suitable for injection molding, and can be made of a well-known thermoplastic resin excellent in heat resistance as material.

The front end surface 31 and the rear end surface 32 are opposed to each other. The disposition hole 33 passes through between the front end surface 31 and the rear end surface 32. The disposition hole 33 includes a front end part 33a and a rear end part 33b. An inner shape of the front end part 33a substantially matches an outer shape of a cross section of the multi optical transmission sheet 10, and has rounded corners, for example. An inner shape of the rear end part 33b substantially matches an outer shape of a cross section of the boot 20, and has rounded corners, for example. A cross-sectional area of the front end part 33a is smaller than a cross-sectional area of the rear end part 33b, and a stepped part 33c is formed between the front end part 33a and the rear end part 33b. The rear end part 33b is a portion into which the boot 20 is fitted.

At least one end part of the multi optical transmission sheet 10 is housed in the disposition hole 33. An end face of the multi optical transmission sheet 10 is present on substantially the same surface as the front end surface 31 of the ferrule 30.

The communication hole 34 is formed on an upper side in the height direction of the ferrule 30 (refer to FIG. 1), and communicates with the disposition hole 33.

The guide holes 35 and 36 are formed on both sides in the width direction with respect to the disposition hole 33 (refer to FIG. 1), and pass through between the front end surface 31 and the rear end surface 32 in substantially parallel with the disposition hole 33. Each of the guide holes 35 and 36 is a hole into which a guide pin is inserted for connecting two ferrules 30.

The instant adhesive 40 bonds the multi optical transmission sheet 10 to the ferrule 30. The instant adhesive 40 is made of material that does not melt the multi optical transmission sheet 10 and the ferrule 30. The instant adhesive 40 is, for example, a cyanoacrylate instant adhesive. The instant adhesive 40 is positioned at least in the communication hole 34.

The boot 20 and the ferrule 30 may also be attached to the other end part (not illustrated) of the multi optical transmission sheet 10.

Figure 3:
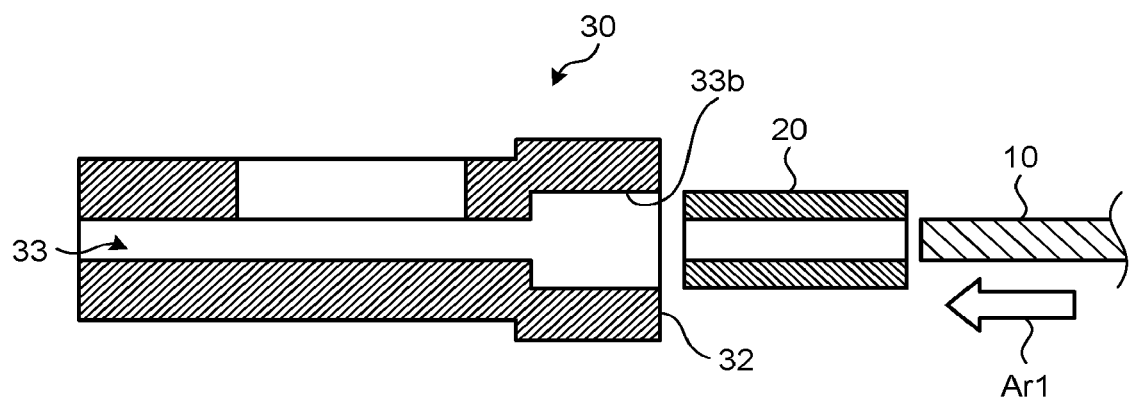
FIG. 3 is an explanatory diagram of a manufacturing method for the multi optical transmission sheet cable with the ferrule illustrated in FIG. 1.
Figure 4:
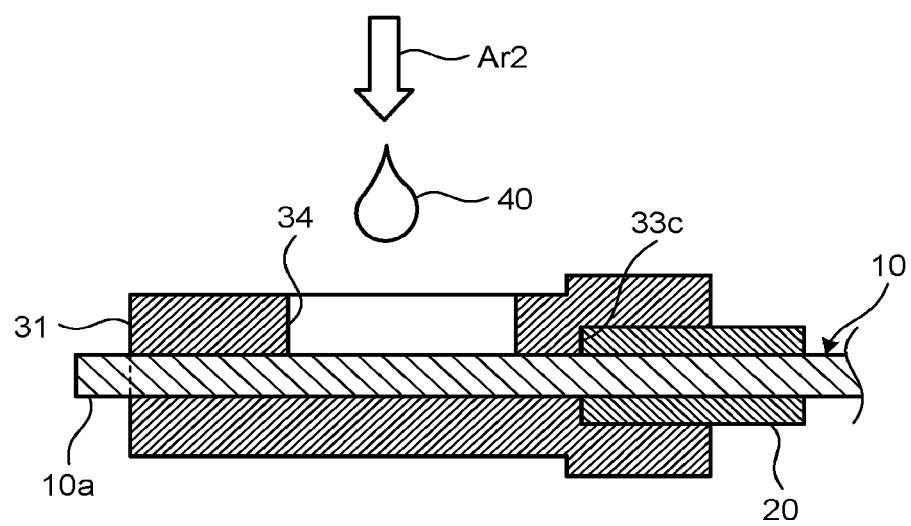
FIG. 4 is an explanatory diagram of the manufacturing method for the multi optical transmission sheet cable with the ferrule illustrated in FIG. 1.
Figure 5:
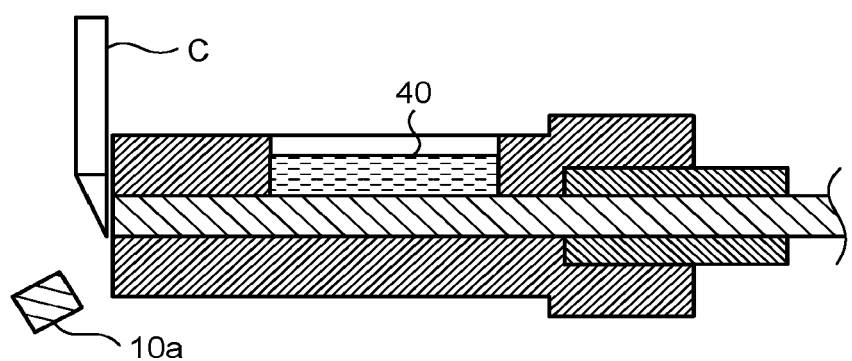
FIG. 5 is an explanatory diagram of the manufacturing method for the multi optical transmission sheet cable with the ferrule illustrated in FIG. 1.

Next, the following describes a manufacturing method for the cable 100 with reference to FIGS. 3, 4, and 5. First, as indicated by arrow Ar1 in FIG. 3, the boot 20 is inserted into the rear end part 33b of the disposition hole 33 from the rear end surface 32 side of the ferrule 30 to be fixed by fitting, an adhesive, and the like, and a housing step is further performed such that the multi optical transmission sheet 10 is inserted into the disposition hole 33 via the boot 20 to be housed therein. Alternatively, the multi optical transmission sheet 10 may be inserted into the boot 20 before being inserted into the disposition hole 33.

Subsequently, as indicated by arrow Ar2 in FIG. 4, a fixing step is performed by dripping and supplying the instant adhesive 40 into the communication hole 34 to bond the multi optical transmission sheet 10 to the ferrule 30 to be fixed to each other. At this time, the instant adhesive 40 may pass through a gap between the multi optical transmission sheet 10 and an inner wall of the disposition hole 33 to flow to an opposite side of the communication hole 34. As illustrated in FIG. 4, at the time of supplying the instant adhesive 40, a part 10a of the multi optical transmission sheet 10 projects from the front end surface 31 of the ferrule 30. The boot 20 abuts on the stepped part 33c, so that the boot 20 is prevented from being inserted toward the front end surface 31 side which is ahead of the stepped part 33c.

Subsequently, as illustrated in FIG. 5, after the multi optical transmission sheet 10 is bonded to the ferrule 30 with the instant adhesive 40, a cutting-off step is performed by cutting off the part 10a projecting from the front end surface 31 of the ferrule 30 by a cutting tool C such as a cutter. Due to this, the end face of the multi optical transmission sheet 10 and the front end surface 31 of the ferrule 30 are positioned on substantially the same plane.

At the time of manufacturing the cable 100, unlike the conventional tape cores, complicated work of removing the resin tape layer and the batch covering layer, extracting the optical fibers, and inserting the optical fibers into respective optical fiber insertion holes of the ferrule one by one is not required. Additionally, fixing is performed with the instant adhesive, so that working time can also be shortened. Furthermore, the cable 100 can be easily manufactured by a simple and inexpensive tool such as the cutting tool C. Thus, convenience thereof at a work site is high.

The multi optical transmission sheet 10 can cause arrangement distances among the 32 optical transmission regions 11 to have high accuracy. As a result, the cable 100 has a high yield, and enables high-quality optical coupling.

Such multi optical transmission sheet 10 can be manufactured by a manufacturing method exemplified in Patent Literature 1. That is, a transparent plastic material for optical use is melted at a predetermined temperature, a core material to be a material for the core region of the multi optical transmission sheet 10 is extruded and supplied by using a first extrusion device that extrudes the material toward a die, a clad material to be a material for the clad region is extruded and supplied by using a second extrusion device, and a covering material to be a material for the covering part 12 is extruded and supplied by using a third extrusion device. As the extrusion devices, well-known plastic material extrusion devices can be used. A screw extrusion device is typically used, but melt extrusion may be performed by using pressure of a nitrogen gas or the like.

The respective plastic materials are supplied to the die via different flow channels. At this time, the die supplies the core material to a plurality of regions disposed at intervals of a T die, supplies the clad material to surround an outer circumference of the core material in each of the regions, and supplies the covering material to surround an outer circumference of the clad material. The core material, the clad material, and the covering material merge with each other, but separately flow without being mixed.

The T die includes a first flow channel in which the core material and the clad material flow in a double structure, and a second flow channel in which the covering material flows. The first flow channel is constituted of, for example, a pipe material passing through the second flow channel, and has a distal end having a nozzle shape. The T die integrally extrudes the core material, the clad material, and the covering material as a sheet through a slit-shaped discharge port thereof. Due to this, a principal surface of an extruded sheet-shaped body is formed along a direction in which the core materials are arranged in a line.

In a process in which the core material merges with the clad material to be discharged from the T die, a refractive index imparting material as a dopant of the core material gradually spreads in a radial direction, and GI type refractive index distribution is formed accordingly.

The extruded sheet-shaped body is brought into contact with a surface of a cooling roll by a capstan roll, and is uniformly cooled. By drawing the sufficiently cooled sheet-shaped body with a desired magnification by a plurality of drawing rolls, the multi optical transmission sheet 10 can be manufactured. The manufactured multi optical transmission sheet 10 is wound by a winding roll.

By designing a position of the first flow channel in the T die with high accuracy, the arrangement distance among the optical transmission regions 11 in the multi optical transmission sheet 10 can be caused to match a desired distance with high accuracy.

Each of the core material, the clad material, and the covering material is a transparent plastic material, and can be manufactured by a method known in the art similar to the case of Patent Literature 1. Typically, the core material and the clad material are required to transmit light, so that it is preferable that the core material and the clad material are transparent in a wavelength band of a light source to be used, and are materials including little foreign substances. For example, a fully fluorinated resin material, a partially fluorinated resin material, a partially chlorinated resin material, and an acrylic material are used, but the embodiment is not limited thereto. A partially deuterated resin obtained by substituting hydrogen atoms in the resin with deuterium atoms may also be used. As the covering material, used are an acrylic material, a polycarbonate material, and the like that are transparent and inexpensive, but the embodiment is not limited thereto. These plastic materials can be manufactured by using a typical polymerization method of performing polymerization using a monomer.

Next, the following describes an example of a characteristic of the multi optical transmission sheet. In a case in which light is incident on the multi optical transmission sheet 10 from one end face side of the optical transmission region 11, and the light is transmitted toward the other end face side, an $M^2$ value of a beam of emitted light is equal to or larger than 1.7. A length of the multi optical transmission sheet 10 in the longitudinal direction is preferably equal to or smaller than 200 m, more preferably equal to or smaller than 100 m, and yet more preferably equal to or smaller than 50 m.

Return light from a distant place is generated such that light is emitted from a light emitting element such as a Vertical Cavity Surface Emitting Laser (VCSEL), is incident on the multi optical transmission sheet 10 to be propagated from one end face side as an end face on the light emitting element side, and part of the light is reflected by an end part of the multi optical transmission sheet 10 on the light receiving element side to be returned to the light emitting element side again. The light returned to the light emitting element side may be return light from the vicinity of the light emitting element, but such return light from the vicinity thereof is not assumed to be a cause of destabilizing the light emitting element.

As a result of intensive research, the present inventors have found that a main cause of deterioration in transmission quality especially in short-distance transmission is fluctuation of lower frequency than a relaxation frequency of the light emitting element caused by return light from a distant place.

The present inventors have also focused on the $M^2$ value that has been conventionally used as a parameter representing quality of a light beam as a factor representing a characteristic of an optical fiber that can reduce return light from a distant place.

As a result of intensive research about use of the $M^2$ value, which has been conventionally used as a parameter representing quality of a laser beam, as a design value of a multimode optical fiber, the present inventors have found that influence of return light from a distant place can be reduced by using an optical fiber with which the $M^2$ value is controlled to be a specific value especially in a case of short-distance communication.

The present inventors have further found that the fact described above can also be applied to the optical transmission region 11 of the multi optical transmission sheet 10.

Magnitude of the $M^2$ value can be controlled depending on a type of material constituting the core region in the optical transmission region 11 of the multi optical transmission sheet 10, core refractive index distribution, and a manufacturing condition for the multi optical transmission sheet 10.

With a lower limit length that can be practically used of the multi optical transmission sheet 10, the $M^2$ value is equal to or larger than 1.7. It is not preferable that the $M^2$ value is smaller than 1.7 because transmission quality is deteriorated due to influence of reflected return light.

When the length of the multi optical transmission sheet 10 is equal to or smaller than 200 m, for example, the $M^2$ value is preferably equal to or smaller than 5.0 with an upper limit length to be used. It is not preferable that the $M^2$ value is larger than 5.0 because a transmission loss caused by increase of a higher order mode is increased.

The length of the multi optical transmission sheet 10 is preferably equal to or smaller than 200 m, more preferably equal to or smaller than 100 m, and yet more preferably equal to or smaller than 50 m. If the length is too large, influence of a scattering loss of forward scattering becomes larger than the effect of reducing return light, so that transmission quality is rather deteriorated.

The following describes the multi optical transmission sheet according to the embodiment more specifically. FIGS. 6A and 6B are diagrams illustrating the size of the multi optical transmission sheet and a disposition example of the optical transmission regions. On a multi optical transmission sheet 10A illustrated in FIG. 6A, 16 optical transmission regions 11A are disposed in a line in a covering part 12A. A configuration of each of the optical transmission regions 11A is the same as the configuration of the optical transmission region 11 of the multi optical transmission sheet 10. A configuration of the covering part 12A is the same as the configuration of the covering part 12 of the multi optical transmission sheet 10. On the other hand, on the multi optical transmission sheet 10 illustrated in FIG. 6B, the optical transmission regions 11 are disposed in two lines in the covering part 12. Where the height of the covering parts 12 and 12A is x, and the width of the covering parts 12 and 12A is y, one line of the optical transmission regions 11A are arranged at a position at a height of x/2 on the multi optical transmission sheet 10A, and two lines of the optical transmission regions 11 are symmetrically arranged with respect to the position at the height of x/2 on the multi optical transmission sheet 10. On both of the multi optical transmission sheets 10 and 10A, the optical transmission regions 11 or 11A are symmetrically arranged with respect to a position at a width of y/2. Where a radius of a rounded corner portion of the covering parts 12 and 12A is r. The corner of a cross-sectional shape of the multi optical transmission sheet according to the embodiment is not necessarily rounded, and r may be 0 μm. The cross-sectional shape of the multi optical transmission sheet according to the embodiment may be an ellipse.

FIG. 6C is a table illustrating an example of a relation among the number of cores as the number of the optical transmission regions on the multi optical transmission sheet, a minimum value of y (ymin), a maximum value of y (ymax), a minimum value of x (xmin), a maximum value of x (xmax), and a maximum value of r (rmax). The r is equal to or larger than 0 μm. A pitch between guide holes of an MT ferrule of an MT connector is 4.6 mm in a case of one row including 4 to 12 cores and a case of two rows including 8 to 24 cores, and is 5.3 mm in a case of one row including 16 cores and a case of two rows including 32 cores according to JIS C5981, for example. The guide hole diameters are 0.7 mm and 0.55 mm, respectively. A minimum value of the height of the MT ferrule is 2.54 mm. Where the height of the covering part is 125 μm, values of ymin, ymax, xmin, xmax, and rmax illustrated in FIG. 6C can satisfy a standard of JIS C5981. Accuracy of flatness of the covering part, straightness of arrangement of the optical transmission regions, roundness of the core region and the clad region, concentricity of the core region and the clad region, and the like can be easily caused to be equal to or smaller than several micrometers. FIG. 6C illustrates cases of 4 cores to 32 cores, but the number of cores is not limited thereto. For example, the number of cores may be 2, and the number of rows may be 1. In this case, the values of ymin, ymax, xmin, xmax, and rmax are, for example, 0.375 μm, 3.900 μm, 0.125 μm, 2.540 μm, and 1.270 μm, respectively.

Second Embodiment

Figure 7:
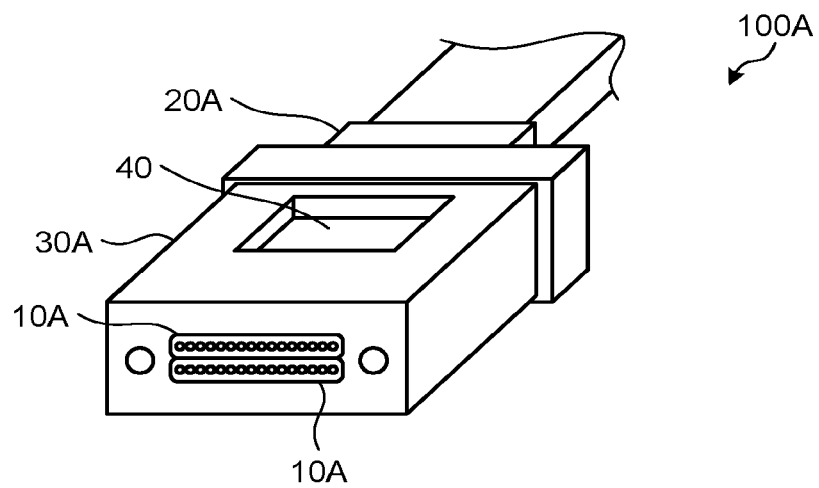
FIG. 7 is a schematic perspective view of a multi optical transmission sheet cable with a ferrule according to a second embodiment.

FIG. 7 is a schematic perspective view of a multi optical transmission sheet cable with a ferrule according to a second embodiment. A cable 100A as the multi optical transmission sheet cable with the ferrule is an example of a batch-molding multi optical transmission sheet assembly. The cable 100A includes a plurality of (two in the present embodiment) multi optical transmission sheets 10A as batch-molding multi optical transmission sheets, a boot 20A, a ferrule 30A as a housing member, and the instant adhesive 40.

The multi optical transmission sheet 10A is the multi optical transmission sheet 10A illustrated in FIG. 6A, and the two multi optical transmission sheets 10A are laminated in the height direction to be disposed.

The boot 20A has substantially the same configuration as that of the boot 20 illustrated in FIG. 1, but is different from the boot 20 in that the two multi optical transmission sheets 10A can be inserted through the boot 20A.

Figure 8A:
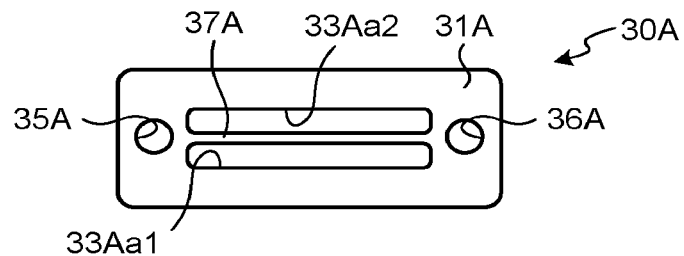
FIG. 8A is a front view illustrating a configuration of the ferrule illustrated in FIG. 7.
Figure 8B:
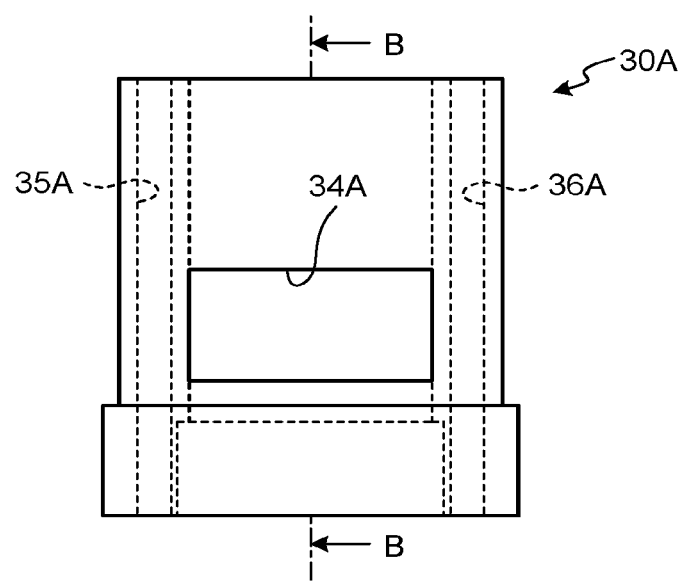
FIG. 8B is a plan view illustrating a configuration of the ferrule illustrated in FIG. 7.
Figure 8C:
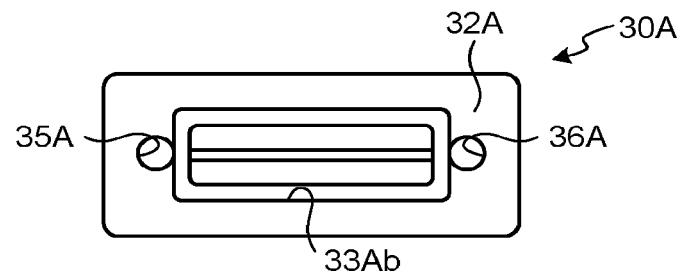
FIG. 8C is a back view illustrating a configuration of the ferrule illustrated in FIG. 7.
Figure 8D:
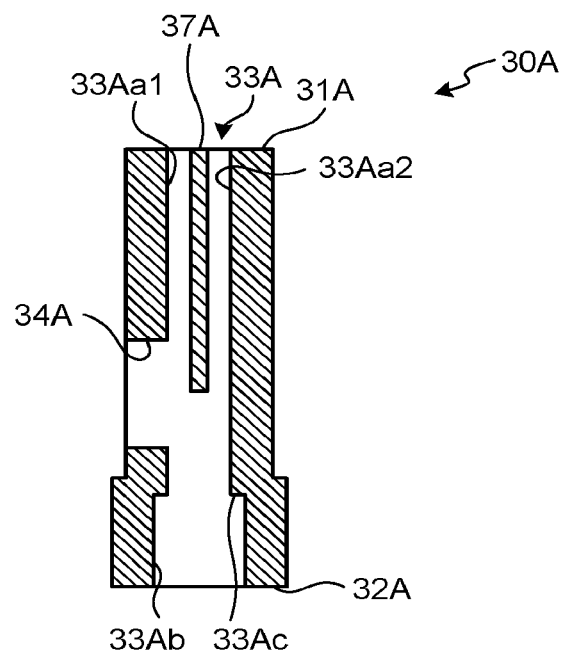
FIG. 8D is a sectional view along line B-B of FIG. 8B.

FIGS. 8A, 8B, 8C, and 8D are a front view, a plan view, and a back view of the ferrule, and a cross-sectional view along line B-B of FIG. 8B, respectively. Similar to the ferrule 30 illustrated in FIGS. 2A to 2D, the ferrule 30A is a ferrule interchangeable with the MT ferrule, and includes a front end surface 31A, a rear end surface 32A, a disposition hole 33A, a communication hole 34A, guide holes 35A and 36A, and a partition wall 37A.

The front end surface 31A and the rear end surface 32A are opposed to each other. The disposition hole 33A passes through between the front end surface 31A and the rear end surface 32A. The disposition hole 33A is partitioned into two parts by the partition wall 37A on the front end surface 31A side. The disposition hole 33A includes front end parts 33Aa1 and 33Aa2, and a rear end part 33Ab. An inner shape of each of the front end parts 33Aa1 and 33Aa2 on the front end surface 31A side substantially matches an outer shape of a cross section of the multi optical transmission sheet 10A, and has rounded corners, for example. On the rear end surface 32A side of the front end parts 33Aa1 and 33Aa2, the front end parts 33Aa1 and 33Aa2 merges with each other to be one hole. An inner shape of the rear end part 33Ab substantially matches an outer shape of a cross section of the boot 20A, and has rounded corners, for example. A total cross-sectional area of the front end parts 33Aa1 and 33Aa2 is smaller than a cross-sectional area of the rear end part 33Ab, and a stepped part 33Ac is formed between the rear end part 33Ab and the front end parts 33Aa1 and 33Aa2. The rear end part 33Ab is a portion into which the boot 20A is fitted.

At least one end part of each of the two multi optical transmission sheets 10A is housed in the disposition hole 33A. An end face of each of the multi optical transmission sheets 10A is present on substantially the same surface as the front end surface 31A of the ferrule 30A.

The communication hole 34A is formed on an upper side in the height direction of the ferrule 30A, and communicates with the disposition hole 33A. The partition wall 37A extends to a position closer to the front end surface 31A side than an edge of the communication hole 34A on the rear end surface 32A side.

The guide holes 35A and 36A are formed on both sides in the width direction with respect to the disposition hole 33A, and pass through between the front end surface 31A and the rear end surface 32A in substantially parallel with the disposition hole 33A.

The instant adhesive 40 bonds the two multi optical transmission sheets 10A to the ferrule 30A. The instant adhesive 40 is the same as the instant adhesive 40 illustrated in FIG. 1. The instant adhesive 40 is positioned at least in the communication hole 34A.

The boot 20A and the ferrule 30A may also be attached to the other end part (not illustrated) of the multi optical transmission sheet 10A.

The disposition of the optical transmission regions 11A on the two multi optical transmission sheets 10A is determined to be equal to the disposition of the optical transmission regions 11 on the multi optical transmission sheet 10 in FIG. 1 by the ferrule 30A. Thus, the two multi optical transmission sheets 10A having one row including 16 cores can be regarded as the multi optical transmission sheet 10 having two rows including 32 cores.

Figure 9:
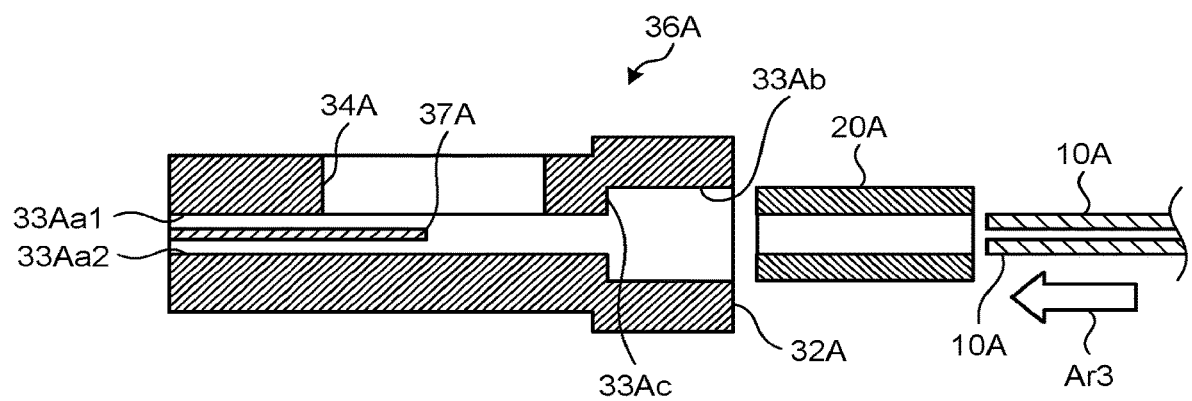
FIG. 9 is an explanatory diagram of a manufacturing method for the multi optical transmission sheet cable with the ferrule illustrated in FIG. 7.

A manufacturing method for the cable 100A is the same as the manufacturing method for the cable 100 illustrated in FIGS. 3 to 5. That is, as indicated by arrow Ar3 in FIG. 9, the boot 20A is inserted into the rear end part 33 Ab of the disposition hole 33A to the stepped part 33Ac from the rear end surface 32A side of the ferrule 30A to be fixed by fitting, an adhesive, and the like, and a housing step is further performed such that the two multi optical transmission sheets 10A are inserted into the disposition hole 33A via the boot 20A to be housed therein.

Subsequently, performed is a step of dripping and supplying the instant adhesive 40 into the communication hole 34A to bond the two multi optical transmission sheets 10A to the ferrule 30A to be fixed to each other. At this time, the instant adhesive 40 reaches the periphery of the multi optical transmission sheet 10A on a lower side because the partition wall 37A merely extends to the middle of the communication hole 34A. As a result, the two multi optical transmission sheets 10A and the ferrule 30A are favorably bonded to each other. At the time of supplying the instant adhesive 40, part of the two multi optical transmission sheets 10A projects from the front end surface 31A of the ferrule 30A.

After the two multi optical transmission sheets 10A is bonded to the ferrule 30A with the instant adhesive 40, a cutting-off step is performed by cutting off part of the two multi optical transmission sheets 10A projecting from the front end surface 31A of the ferrule 30A by the cutting tool C. Due to this, end faces of the two multi optical transmission sheets 10A and the front end surface 31A of the ferrule 30A are positioned on substantially the same plane.

At the time of manufacturing the cable 100A, similar to the case of the cable 100, complicated work is not required, and the working time can be shortened. Furthermore, convenience thereof at a work site is high. Additionally, the cable 100A has a high yield, and enables high-quality optical coupling.

For the multi optical transmission sheet 10A, preferable are cases in which the number of cores is 4 to 16 and the number of rows is 1 in the table illustrated in FIG. 6C. In these cases, xmax is 0.450 µm in each case and rmax is 0.25 µm in each case. Alternatively, the number of cores may be 2, and the number of rows may be 1. In this case, the values of ymin, ymax, xmin, xmax, and rmax are, for example, 0.375 µm, 3.900 µm, 0.125 µm, 0.450 µm, and 0.25 µm, respectively.

Third Embodiment

Figure 10:
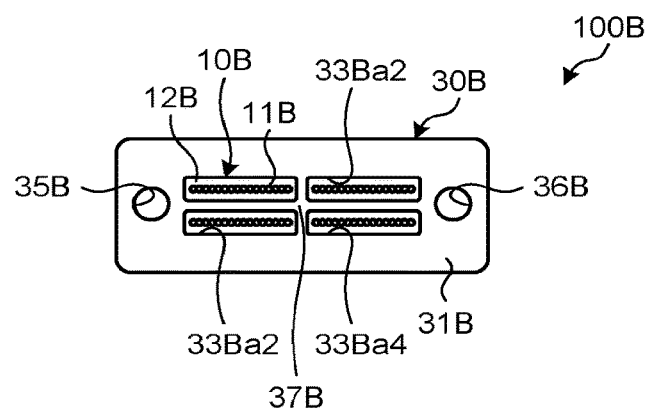
FIG. 10 is a schematic end face view of a multi optical transmission sheet cable with a ferrule according to a third embodiment.

FIG. 10 is a schematic end view of a multi optical transmission sheet cable with a ferrule according to a third embodiment. A cable 100B as the multi optical transmission sheet cable with the ferrule is an example of a batch-molding multi optical transmission sheet assembly. The cable 100B includes a plurality of (four in the present embodiment) multi optical transmission sheets 10B as batch-molding multi optical transmission sheets, a boot (not illustrated), a ferrule 30B as a housing member, and an instant adhesive (not illustrated). The boot and the instant adhesive have the same configurations as those of corresponding elements of the cable 100A.

Similar to the multi optical transmission sheet 10A illustrated in FIG. 6A, the multi optical transmission sheet 10B has a configuration in which 16 optical transmission regions 11B are disposed in a line in a covering part 12B.

Similar to the ferrule 30A illustrated in FIGS. 8A to 8D, the ferrule 30B is a ferrule interchangeable with the MT ferrule, and includes a front end surface 31B, a rear end surface, a disposition hole, a communication hole, guide holes 35B and 36B, and a partition wall 37B. The disposition hole has the same configuration as that of the disposition hole 33A of the ferrule 30A except that the disposition hole is partitioned into four parts by the partition wall 37B on the front end surface 31B side. The rear end surface and the communication hole also have the same configurations as those of corresponding elements of the ferrule 30A.

Due to the ferrule 30B, the disposition of the optical transmission regions 11B on the four multi optical transmission sheets 10B can be regarded as the same as that of the multi optical transmission sheet 10 having two rows including 32 cores.

A manufacturing method for the cable 100B is the same as the manufacturing method for the cable 100 illustrated in FIGS. 3 to 5. Thus, similar to the case of the cable 100 or the like, complicated work is not required at the time of manufacturing the cable 100B, and the working time can be shortened. Furthermore, convenience thereof at a work site is high.

For the multi optical transmission sheet 10B, preferable are cases in which the number of cores is 4 and 8, and the number of rows is 1 in the table illustrated in FIG. 6C. In these cases, xmax is 0.450 µm in each case, ymax is 0.900 µm in a case of 4 cores and 1.9 µm in a case of 8 cores, and rmax is 0.25 µm in each case. Alternatively, the number of cores may be 2, and the number of rows may be 1. In this case, the values of ymin, ymax, xmin, xmax, and rmax are, for example, 0.375 µm, 0.400 µm, 0.125 µm, 0.450 µm, and 0.25 µm, respectively.

Additionally, a multi optical transmission sheet in which the number of cores is 2 and the number of rows is 2 can be implemented. In this case, the values of ymin, ymax, xmin, xmax, and rmax are, for example, 0.075 µm, 0.125 µm, 0.635 µm, 2.540 µm, and 0.25 µm, respectively.

Fourth Embodiment

Figure 11A:
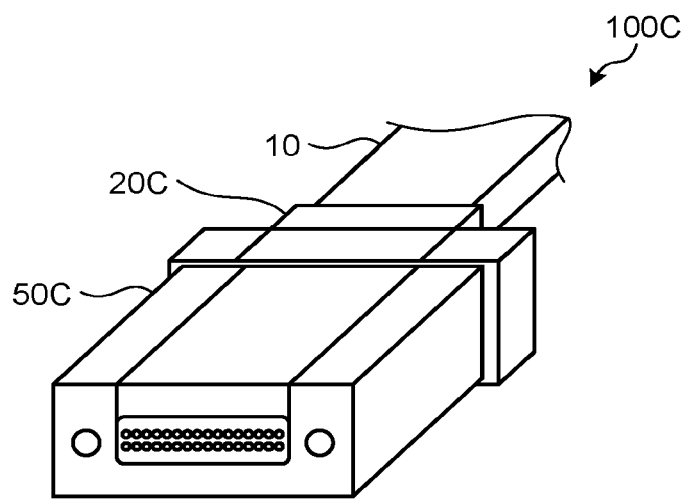
FIG. 11A is a schematic perspective view of a multi optical transmission sheet cable with a ferrule according to a fourth embodiment.
Figure 11B:
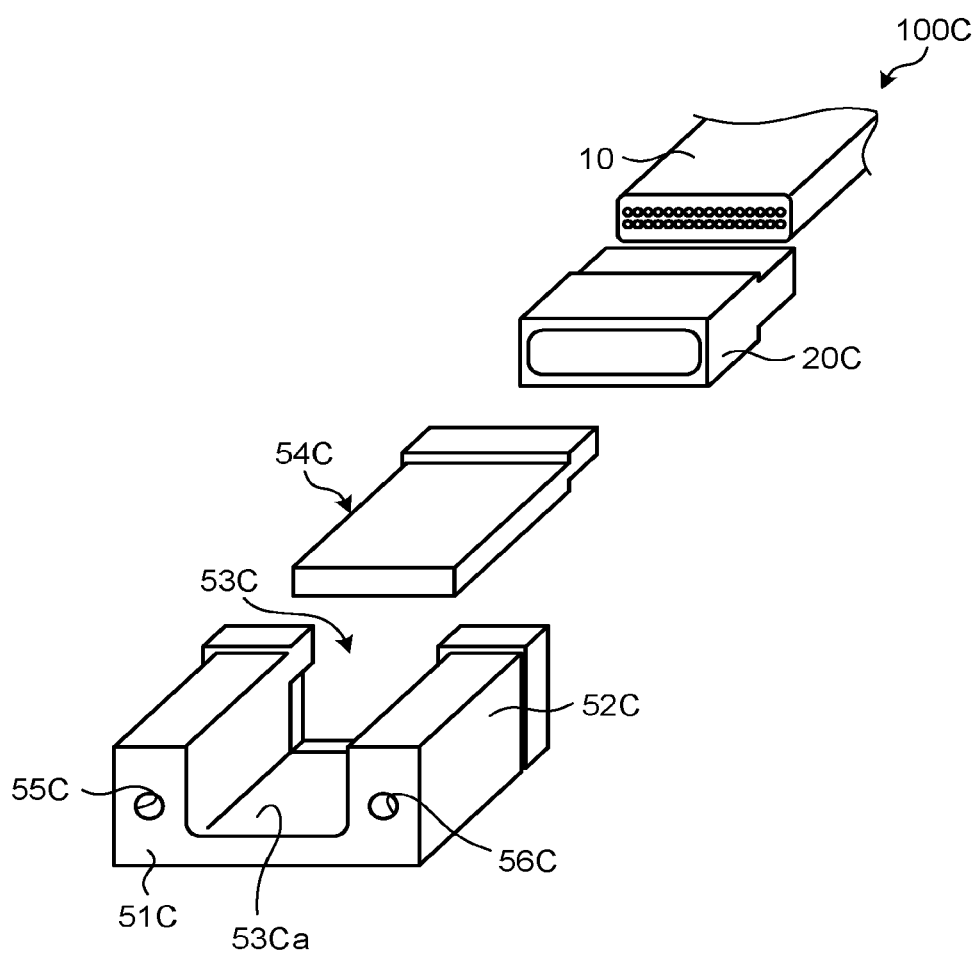
FIG. 11B is a schematic exploded perspective view of the multi optical transmission sheet cable with the ferrule according to the fourth embodiment.

FIG. 11A is a schematic perspective view of a multi optical transmission sheet cable with a ferrule according to a fourth embodiment, and FIG. 11B is a schematic exploded perspective view of the multi optical transmission sheet cable with the ferrule. A cable 100C as the multi optical transmission sheet cable with the ferrule is an example of a batch-molding multi optical transmission sheet assembly. The cable 100C includes the multi optical transmission sheet 10 as a batch-molding multi optical transmission sheet, a boot 20C, a ferrule 50C as a housing member, and an instant adhesive (not illustrated).

The multi optical transmission sheet 10 and the boot 20C are the same as corresponding elements illustrated in FIG. 1, so that description thereof will not be repeated herein.

The ferrule 50C is a ferrule interchangeable with the MT ferrule, and includes a front end surface 51C, a rear end surface 52C, a groove 53C, a lid 54C, and guide holes 55C and 56C.

The front end surface 51C and the rear end surface 52C are opposed to each other. The groove 53C passes through between the front end surface 51C and the rear end surface 52C. The lid 54C covers the groove 53C. The groove 53C and the lid 54C constitute a disposition hole that houses at least one end part of the multi optical transmission sheet 10. A bottom surface 53Ca of the groove 53C can be disposed with accuracy equal to or smaller than several micrometers at a position of x/2 from the center of each of the guide holes 55C and 56C. Herein, x is the height of the covering part 12 illustrated in FIG. 6B. The bottom surface 53Ca may be assumed to be a reference surface for positioning of the multi optical transmission sheet 10.

The guide holes 55C and 56C are formed on both sides in the width direction with respect to the groove 53C, and passes through between the front end surface 51C and the rear end surface 52C in substantially parallel with the groove 53C.

The boot 20C and the ferrule 50C may also be attached to the other end part (not illustrated) of the multi optical transmission sheet 10.

Figure 12:
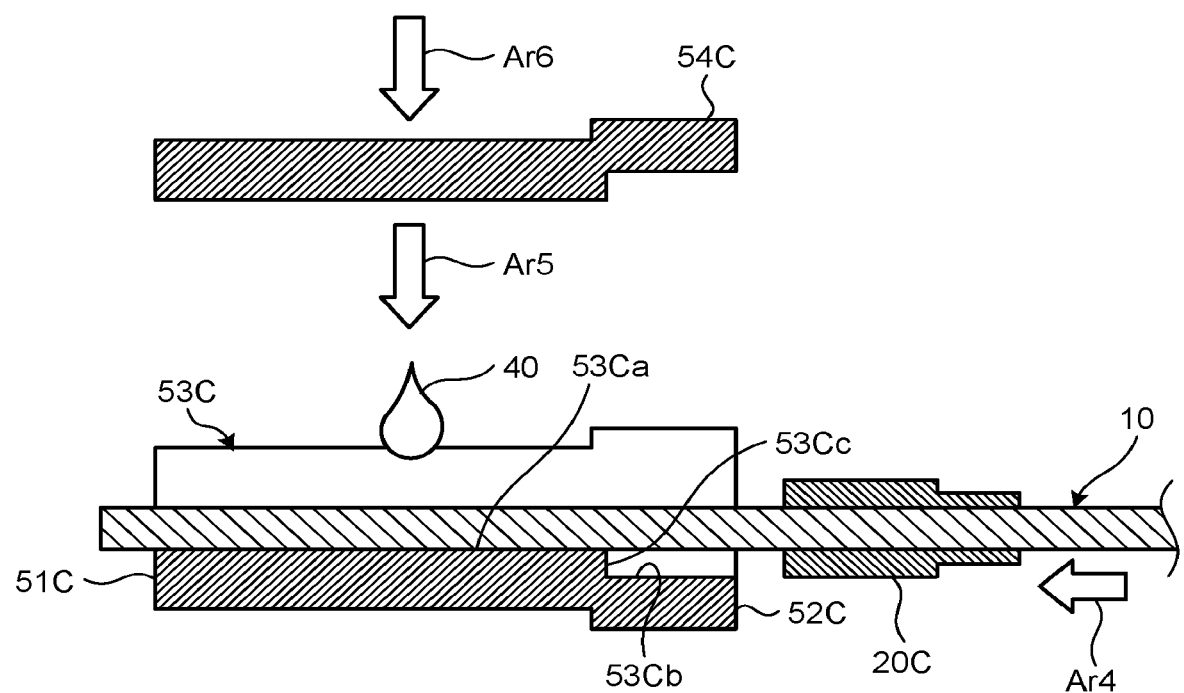
FIG. 12 is an explanatory diagram of a manufacturing method for the multi optical transmission sheet cable with the ferrule illustrated in FIGS. 11A and 11B.
Figure 13:
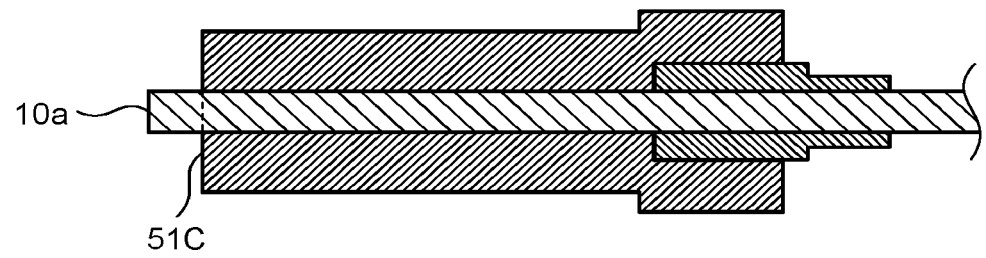
FIG. 13 is an explanatory diagram of the manufacturing method for the multi optical transmission sheet cable with the ferrule illustrated in FIGS. 11A and 11B.
Figure 14:
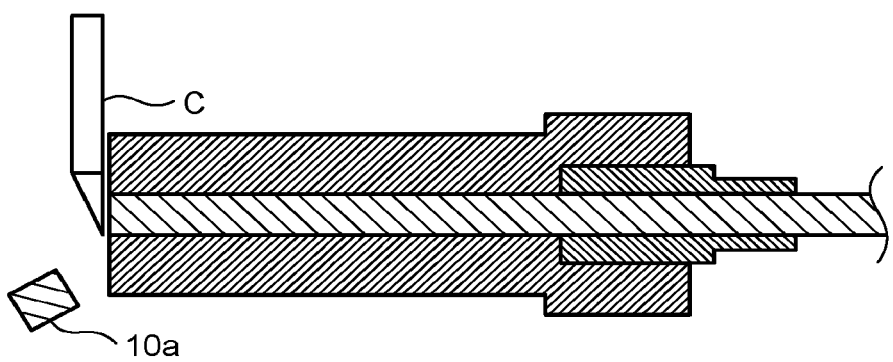
FIG. 14 is an explanatory diagram of the manufacturing method for the multi optical transmission sheet cable with the ferrule illustrated in FIGS. 11A and 11B.

Next, the following describes a manufacturing method for the cable 100C with reference to FIGS. 12, 13, and 14. First, as indicated by arrow Ar4 in FIG. 12, the multi optical transmission sheet 10 inserted into the boot 20C is disposed to abut on the bottom surface 53Ca of the groove 53C in the ferrule 50C. The boot 20C is placed at a rear end part 53Cb of the groove 53C to abut on a stepped part 53Cc, and fixed by fitting, an adhesive, and the like.

Subsequently, before putting the lid 54C on, as indicated by arrow Ar5 in FIG. 12, the instant adhesive 40 is dripped to be supplied into the groove 53C. At this time, the instant adhesive 40 may flow while passing through a gap between the multi optical transmission sheet 10 and an inner wall of the groove 53C. Thereafter, as indicated by Ar6, the lid 54C is put on before the instant adhesive 40 is cured. Due to this, at least one end part of the multi optical transmission sheet 10 is housed in the disposition hole. Thereafter, the instant adhesive 40 is cured, and the multi optical transmission sheet 10 is bonded to the ferrule 50C. As illustrated in FIG. 13, when the lid 54C is put on, the part 10a of the multi optical transmission sheet 10 projects from the front end surface 51C of the ferrule 50C.

Subsequently, as illustrated in FIG. 14, the part 10a projecting from the front end surface 51C of the ferrule 50C is cut off by the cutting tool C such as a cutter. Due to this, an end face of the multi optical transmission sheet 10 and the front end surface 51C of the ferrule 50C are positioned on substantially the same plane.

Also at the time of manufacturing the cable 100C, complicated work is not required, and the working time can be shortened. Furthermore, convenience thereof at a work site is high. Additionally, the cable 100C has a high yield, and enables high-quality optical coupling.

Fifth Embodiment

Figure 15:
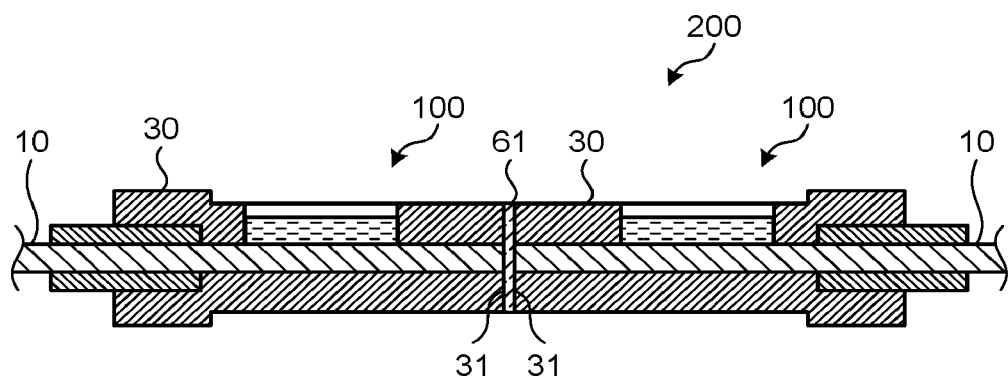
FIG. 15 is a schematic partially cut-off side view of a connection structure according to a fifth embodiment.

FIG. 15 is a schematic partially cut-off side view of a connection structure according to a fifth embodiment. A connection structure 200 is a structure in which two cables 100 are connected to each other. Each of the cables 100 is the cable 100 illustrated in FIG. 1, and the cables 100 are connected to each other so that the front end surfaces 31 of two ferrules 30 are opposed to each other. The two ferrules 30 are positioned with guide pins (not illustrated), and fixed to each other with a fixture (not illustrated).

In the cable 100, the arrangement distance among the optical transmission regions 11 on the multi optical transmission sheet 10 has high accuracy, so that high-quality optical coupling is enabled in the connection structure 200.

A film 61 serving as a refractive index matching member is interposed between the two ferrules 30. The film 61 is made of resin, for example, and a refractive index thereof is higher than that of air and preferably close to a refractive index of the core region. The film 61 has a function of reducing a connection loss of the two cables 100, and a function of preventing the end face of the multi optical transmission sheet 10 from being damaged. In a case of manufacturing the cable 100 using the method illustrated in FIGS. 3, 4, and 5, the connection loss may be increased as compared with a case of performing end face polishing, but the connection loss can be reduced due to the interposed film 61.

Sixth Embodiment

Figure 16:
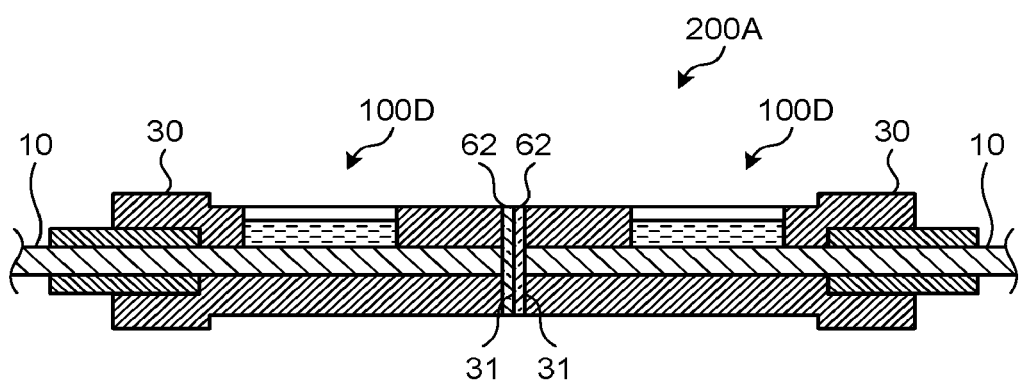
FIG. 16 is a schematic partially cut-off side view of a connection structure according to a sixth embodiment.

FIG. 16 is a schematic partially cut-off side view of a connection structure according to a sixth embodiment. A connection structure 200A is a structure in which two cables 100D are connected to each other. The cable 100D is obtained by disposing, by bonding, for example, a plate-shaped protecting member 62 for protecting the end face of the multi optical transmission sheet 10 at the front end surface 31 of the ferrule 30 of the cable 100 illustrated in FIG. 1. The cables 100D are connected to each other so that the front end surfaces 31 thereof on which protecting members 62 are disposed are opposed to each other. The two ferrules 30 are positioned with guide pins (not illustrated), and fixed to each other with a fixture (not illustrated).

In the cable 100D, the arrangement distance among the optical transmission regions 11 on the multi optical transmission sheet 10 has high accuracy, so that high-quality optical coupling is enabled in the connection structure 200A.

In the connection structure 200A, the protecting members 62 are interposed between the end faces of the two multi optical transmission sheets 10, so that the end face of the multi optical transmission sheet 10 is prevented from being damaged even in use in which the number of times of connection and disconnection is large. The protecting member 62 is preferably made of material having transparency that is high to some extent and high hardness at a wavelength (for example, 850 nm) of light transmitted through the multi optical transmission sheet 10. As such material, polyetherimide such as ULTEM (registered trademark), and resin containing alternating copolymer constituted of a monomer of a styrene derivative and a monomer of a maleimide derivative can be employed. The thickness of the protecting member 62 is preferably in a range from several micrometers to several tens of micrometers, for example, in view of reduction of attenuation of light. However, the thickness of the protecting member 62 is not limited thereto, and can be appropriately set in accordance with transmittance of the material or a permissible connection loss.

Figure 17A:
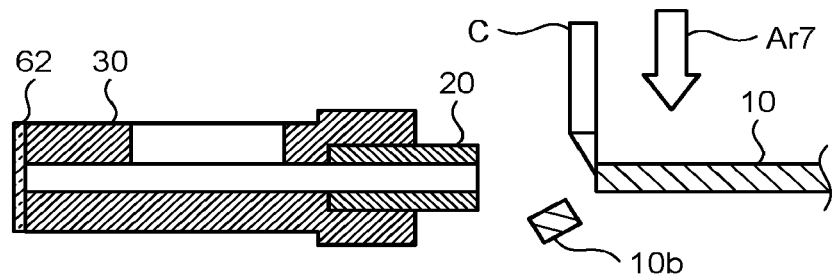
FIG. 17A is an explanatory diagram of one step of a manufacturing method for a multi optical transmission sheet cable with a ferrule illustrated in FIG. 16.

In a case of manufacturing the cable 100D, as indicated by arrow Ar7 in FIG. 17A, a part 10b having a predetermined length is cut off from one end face of the multi optical transmission sheet 10, and the end face is flattened. The boot 20 may be attached to the ferrule 30.

Subsequently, as indicated by arrow Ar8 in FIG. 17B, a housing step is performed by inserting the multi optical transmission sheet 10 into the disposition hole 33 to be housed therein via the boot 20. At this time, the multi optical transmission sheet 10 is inserted so that the end face thereof abuts on the protecting member 62.

Subsequently, as indicated by arrow Arg in FIG. 17C, performed is a step of dripping and supplying the instant adhesive 40 into the communication hole 34, and bonding the multi optical transmission sheet 10 to the ferrule 30 to be fixed. In this way, also at the time of manufacturing the cable 100D, complicated work is not required, and the working time can be shortened. Furthermore, convenience thereof at a work site is high. Additionally, the cable 100D can prevent damage from being caused by connection or disconnection, so that the cable 100D is appropriate for use in which the number of times of connection and disconnection is large.

Seventh Embodiment

Figure 18A:
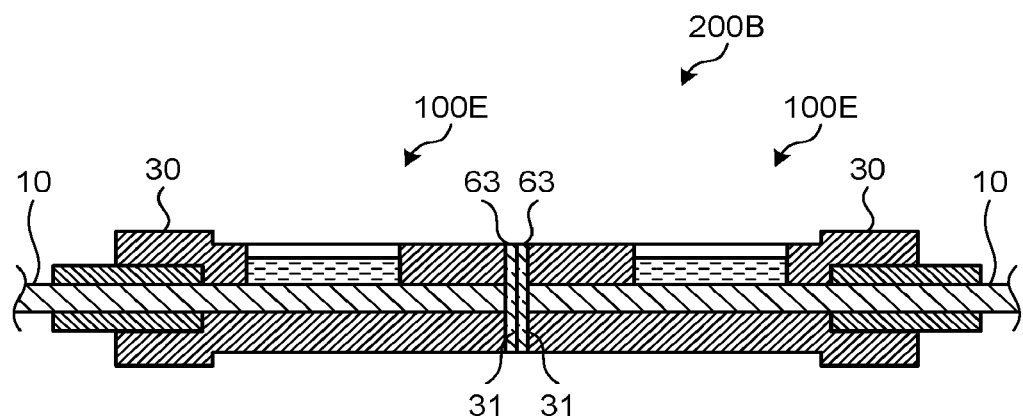
FIG. 18A is a schematic partially cut-off side view of a connection structure according to a seventh embodiment.
Figure 18B:
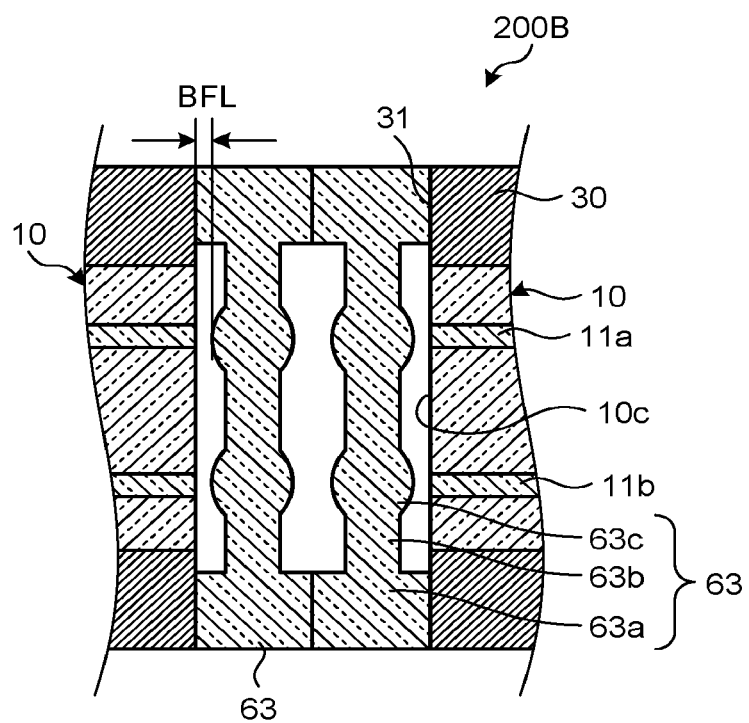
FIG. 18B is a schematic partially enlarged view of the connection structure according to the seventh embodiment.

FIG. 18A is a schematic partially cut-off side view of a connection structure according to a seventh embodiment, and FIG. 18B is a schematic partially enlarged view of the connection structure. As illustrated in FIG. 18A, a connection structure 200B is a structure in which two cables 100E are connected to each other. The cable 100E is obtained by disposing a lens array unit 63 as a lens array part on the front end surface 31 of the ferrule 30 of the cable 100 illustrated in FIG. 1. The cables 100E are connected to each other so that the front end surfaces 31 on which lens array units 63 are disposed are opposed to each other. The two ferrules 30 are positioned with guide pins (not illustrated), and fixed to each other with a fixture (not illustrated).

The following describes the lens array unit 63 with reference to FIG. 18B. The lens array unit 63 includes a frame part 63a, a supporting part 63b, and a lens array 63c. The frame part 63a is a frame-shaped portion corresponding to the shape of the front end surface 31 of the ferrule 30, and is fixed to the ferrule 30 by bonding, for example. The supporting part 63b is a stick-shaped or plate-shaped portion extending from the frame part 63a, and supports the lens array 63c. The lens array 63c is constituted of lenses that are disposed corresponding to the disposition of the optical transmission regions of the multi optical transmission sheet 10. In FIG. 18B, an optical transmission region 11a is an optical transmission region on an upper row, and an optical transmission region 11b is an optical transmission region on a lower row. Sixteen optical transmission regions are arranged in each row in a direction vertical to the drawing. Thus, the lens array 63c is constituted of 32 lenses. Due to the frame part 63a and the supporting part 63b, each of the lenses is separated from an end face 10c of the multi optical transmission sheet 10 by a back focal length (BFL). Each of the lenses is optically connected to the core region of each of the optical transmission regions correspondingly disposed. The frame part 63a and the supporting part 63b also have a function of separating the lenses of one of the lens array units 63 from the lenses of the other one of the lens array units 63.

Similar to the protecting member 62, the lens array unit 63 is preferably made of material having transparency that is high to some extent and high hardness at a wavelength of light transmitted through the multi optical transmission sheet.

For example, each piece of light transmitted through the core region of the multi optical transmission sheet 10 on the left side of the drawing is caused to be collimated light by a lens that is correspondingly disposed in the lens array unit 63 on the left side of the drawing. Additionally, each piece of the collimated light is collected by the lens that is correspondingly disposed in the lens array unit 63 on the right side of the drawing, and is optically coupled to the core region that is correspondingly disposed on the multi optical transmission sheet 10 on the right side of the drawing.

The lens array unit 63 protects the end face of the multi optical transmission sheet 10, and reduces a connection loss.

The lens is, for example, a biconvex spherical lens, but is not limited thereto. For example, it is preferable that the lens is a plano-convex lens, and is configured so that a plane side abuts on the other lens array unit 63 because this configuration is resistant to dirt or damage. An aspheric lens is preferable because the connection loss can be further reduced. Antireflection coating may be applied to the lenses. If an aperture of the lens is large, the connection loss can be reduced. The aperture of the lens is, for example, 250 μm.

Figure 17B:
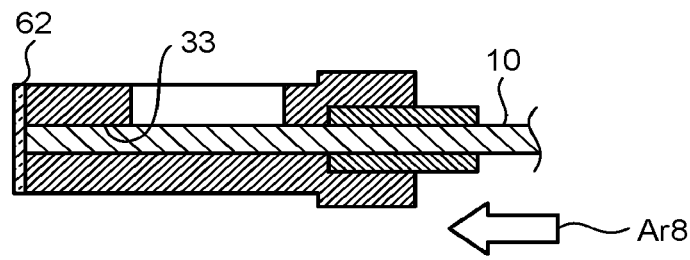
FIG. 17B is an explanatory diagram of a step subsequent to FIG. 17A of the manufacturing method for the multi optical transmission sheet cable with the ferrule illustrated in FIG. 16.
Figure 17C:
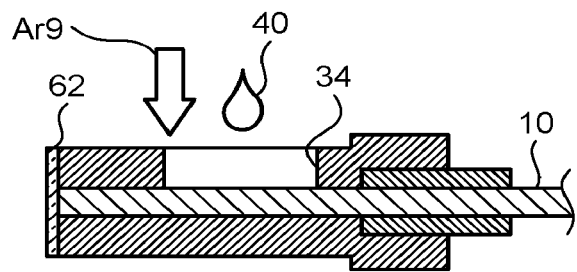
FIG. 17C is an explanatory diagram of a step subsequent to FIG. 17B of the manufacturing method for the multi optical transmission sheet cable with the ferrule illustrated in FIG. 16.

The cable 100E can be manufactured by using the same method as the manufacturing method for the cable 100D illustrated in FIGS. 17A to 17C. Also at the time of manufacturing the cable 100E, complicated work is not required, and the working time can be shortened. Furthermore, convenience thereof at a work site is high. Additionally, the cable 100E can prevent damage from being caused by connection or disconnection, so that the cable 100E is appropriate for use in which the number of times of connection and disconnection is large.

The multi optical transmission sheet 10 and the lens array unit 63 may be replaced with the multi optical transmission sheet and a lens array unit including one row, or a plurality of rows such as three or more rows. The number of lenses in the lens array unit can be one to several hundreds or more.

Eighth Embodiment

Figure 19A:
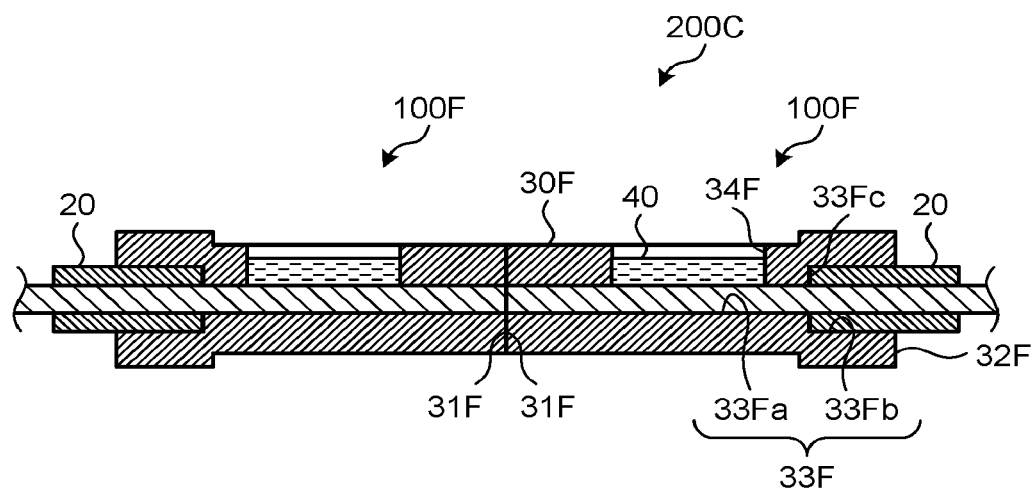
FIG. 19A is a schematic partially cut-off side view of a connection structure according to an eighth embodiment.
Figure 19B:
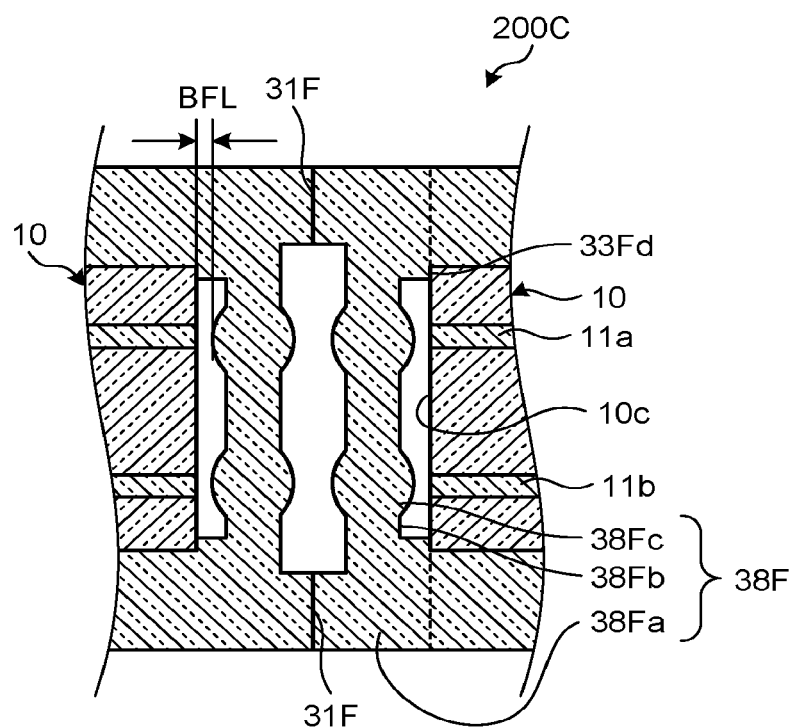
FIG. 19B is a schematic partially enlarged view of the connection structure according to the eighth embodiment.

FIG. 19A is a schematic partially cut-off side view of a connection structure according to an eighth embodiment, and FIG. 19B is a schematic partially enlarged view of the connection structure. As illustrated in FIG. 19A, a connection structure 200C is a structure in which two cables 100F are connected to each other. The cable 100F has a configuration obtained by replacing the ferrule 30 of the cable 100 illustrated in FIG. 1 with a ferrule 30F.

The ferrule 30F is a ferrule interchangeable with the MT ferrule, and includes a front end surface 31F, a rear end surface 32F opposed to the front end surface 31F, a disposition hole 33F, a communication hole 34F, and guide holes (not illustrated).

The disposition hole 33F extends from the rear end surface 32F to the front end surface 31F side. The disposition hole 33F includes a front end part 33Fa and a rear end part 33Fb. An inner shape of the front end part 33Fa substantially matches the outer shape of the cross section of the multi optical transmission sheet 10, and has rounded corners, for example. An inner shape of the rear end part 33Fb substantially matches the outer shape of the cross section of the boot 20, and has rounded corners, for example. A cross-sectional area of the front end part 33Fa is smaller than a cross-sectional area of the rear end part 33Fb, and a stepped part 33Fc is formed between the front end part 33Fa and the rear end part 33Fb. The rear end part 33Fb is a portion into which the boot 20 is fitted.

As illustrated in FIG. 19B, on the front end surface 31F side of the ferrule 30F, a stepped part 33Fd and a lens array part 38F integrated with the ferrule 30F are disposed. The stepped part 33Fd abuts on the end face 10c of the multi optical transmission sheet 10. The lens array part 38F includes a frame part 38Fa, a supporting part 38Fb, and a lens array 38Fc. The frame part 38Fa is a frame-shaped portion constituting the front end surface 31F of the ferrule 30F. The ferrule 30F and the lens array part 38F are integrally formed. The supporting part 38Fb is a stick-shaped or plate-shaped portion extending from the frame part 38Fa, and supports the lens array 38Fc. The lens array 38Fc includes lenses that are disposed corresponding to the disposition of the optical transmission regions of the multi optical transmission sheet 10. In FIG. 19B, the optical transmission region 11a is an optical transmission region in an upper row, and an optical transmission region 11b is an optical transmission region in a lower row. Sixteen optical transmission regions are arranged in each row in a direction vertical to the drawing. Thus, the lens array 38Fc includes 32 lenses. Due to the frame part 38Fa, the supporting part 38Fb, and the stepped part 33Fd, each of the lenses is separated from the end face 10c of the multi optical transmission sheet 10 by the BFL. Each of the lenses is optically connected to the core region of each of the optical transmission regions correspondingly disposed. The frame part 38Fa also has a function of separating the lenses of one lens array part 38F from the lenses of the other lens array part 38F.

The cables 100F are connected to each other so that front end surfaces 31F on which lens array parts 38F are disposed are opposed to each other. The two ferrules 30F are positioned with guide pins (not illustrated), and fixed to each other with a fixture (not illustrated).

Similar to the protecting member 62, the ferrule 30F including the lens array part 38F is preferably made of material having transparency that is high to some extent and high hardness at a wavelength of light transmitted through the multi optical transmission sheet.

For example, each piece of light transmitted through the core region of the multi optical transmission sheet 10 on the left side of the drawing is caused to be collimated light by a lens that is correspondingly disposed in the lens array part 38F on the left side of the drawing. Additionally, each piece of the collimated light is collected by the lens that is correspondingly disposed in the lens array part 38F on the right side of the drawing, and is optically coupled to the core region that is correspondingly disposed on the multi optical transmission sheet 10 on the right side of the drawing.

The lens array part 38F protects the end face of the multi optical transmission sheet 10, and reduces the connection loss.

The lens is, for example, a biconvex spherical lens, but is not limited thereto. For example, the lens may be a plano-convex lens, and configured so that a plane side abuts on the other lens array part 38F.

Alternatively, the lens may be an aspheric lens. Antireflection coating may be applied to the lens. If an aperture of the lens is large, the connection loss can be reduced. The aperture of the lens is, for example, 250 μm.

The cable 100F can be manufactured by using the same method as the manufacturing method for the cable 100D illustrated in FIGS. 17A to 17C. At the time of inserting the multi optical transmission sheet 10 into the ferrule 30F, the multi optical transmission sheet 10 is inserted until the end face 10c abuts on the stepped part 33Fd.

Also at the time of manufacturing the cable 100F, complicated work is not required, and the working time can be shortened. Furthermore, convenience thereof at a work site is high. Additionally, the cable 100F can prevent damage from being caused by connection or disconnection, so that the cable 100F is appropriate for use in which the number of times of connection and disconnection is large.

The ferrule 30F and the lens array part 38F are integrally formed, so that position accuracy of each of the optical transmission regions of the multi optical transmission sheet 10 and the lens corresponding thereto can be increased.

The multi optical transmission sheet 10 and the lens array part 38F may be replaced with a multi optical transmission sheet and a lens array part having one row, or a plurality of rows such as three or more rows. The number of lenses in the lens array unit can be one to several hundreds or more.

Ninth Embodiment

Figure 20:
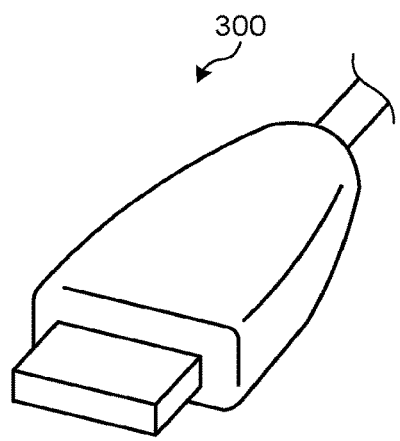
FIG. 20 is a schematic perspective view of a cable with a connector according to a ninth embodiment.

FIG. 20 is a schematic perspective view of a cable with a connector according to a ninth embodiment. The cable 300 as the cable with the connector is an example of a batch-molding multi optical transmission sheet assembly, and is a cable for communication obtained by integrating a cable of High Definition Multimedia Interface (HDMI) (registered trademark) TYPE-A with a multi optical transmission sheet cable with a ferrule.

Figure 21:
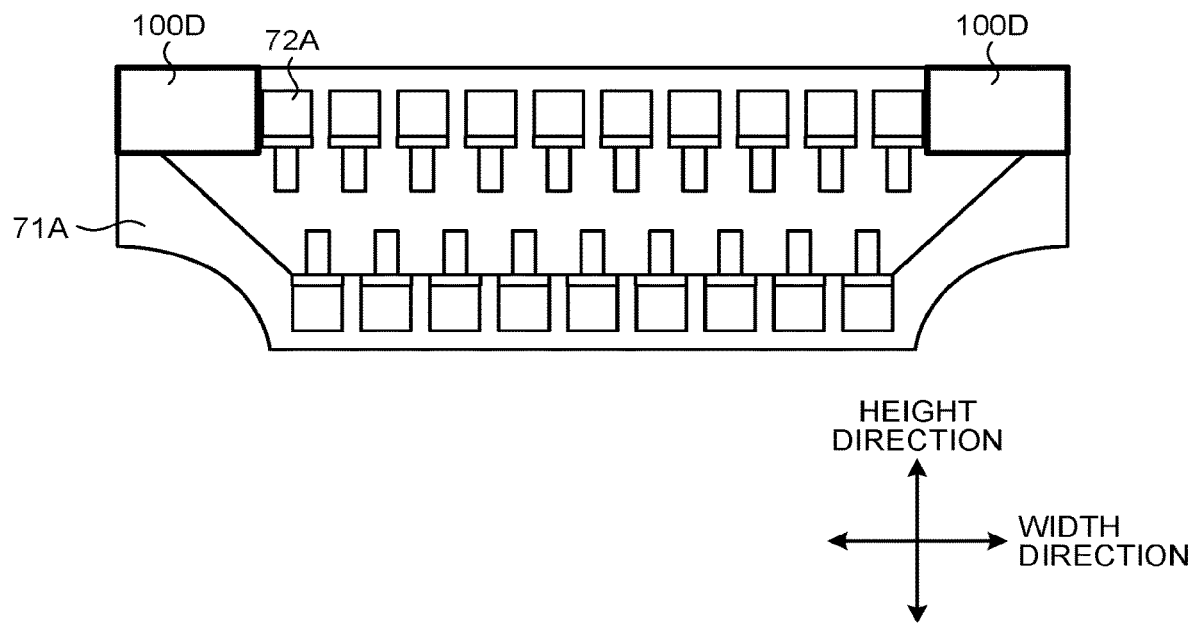
FIG. 21 is a diagram illustrating a connector end face of the cable with the connector illustrated in FIG. 20.

FIG. 21 is a diagram illustrating a connector end face of the cable 300. A connector housing 71A is configured as a plug, and houses a plurality of electric contact pins 72A arranged in accordance with HDMI standard (for example, HDMI 1.0 to 2.1). Additionally, in the connector housing 71A, the cable 100D as the multi optical transmission sheet cable with the ferrule is disposed in an empty space in which the electric contact pin 72A is not disposed. The empty space is not limited as long as it is a space in which the electric contact pin 72A is not disposed in a case of viewing the connector end face. In the present embodiment, the empty spaces are present on both sides in the width direction of the electric contact pins 72A arranged in two rows in the height direction. A size of each of the empty spaces is substantially represented as width 2 mm×height 1 mm.

The cable 300 is interchangeable with an existing cable with an HDMI TYPE-A connector, and can implement a transmission speed equal to or higher than 100 Gbps by using the cable 100D.

For example, to transmit a video signal of 8K@120P, a transmission speed equal to or higher than 100 Gbps is required. Where the transmission speed per channel of a VCSEL as a signal light source is 14 to 25 Gbps, 4 to 7 channels are required.

Thus, in the cable 300, by disposing the cable 100D including the multi optical transmission sheet cable in the empty space, a high-speed optical video transmission channel can be added while keeping interchangeability with a conventional HDMI TYPE-A connector.

The following describes configuration examples of the multi optical transmission sheet and the lens array part preferably used for the cable 100D.

Figure 22A:
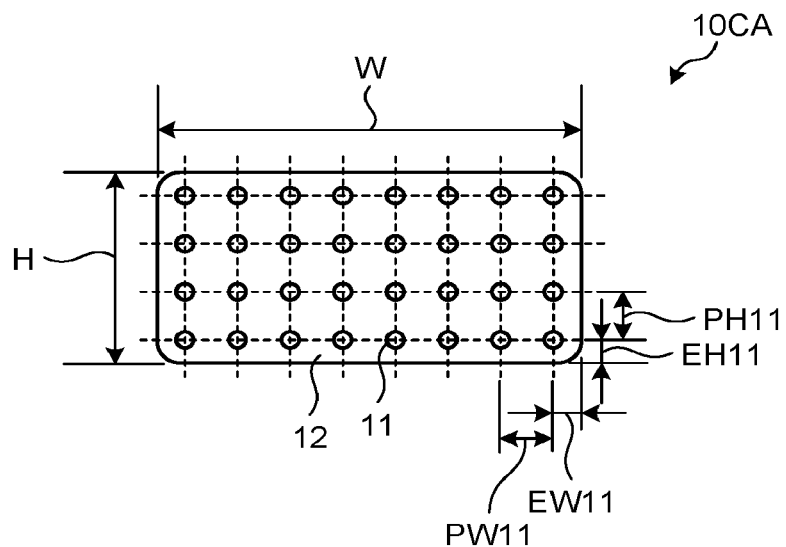
FIG. 22A is a diagram illustrating an exemplary configuration of a multi optical transmission sheet.
Figure 22B:
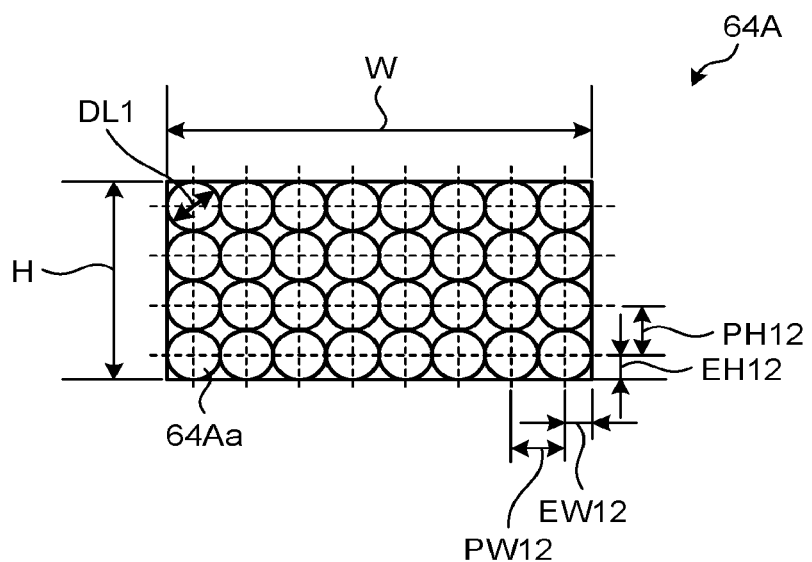
FIG. 22B is a diagram illustrating an exemplary configuration of a lens array part.

FIG. 22A is a diagram illustrating an exemplary configuration of a multi optical transmission sheet 10CA, and FIG. 22B is a diagram illustrating an exemplary configuration of a lens array part 64A.

The multi optical transmission sheet 10CA has a configuration including 32 cores in which 32 optical transmission regions 11 are arranged in 8 lines×4 rows inside the covering part 12. Where a width W is 2000 μm and a height H is 1000 μm, the multi optical transmission sheet 10CA can be housed in an empty space of about 2 mm×1 mm. At this time, a pitch PH11 in the height direction and a pitch PW11 in the width direction of the optical transmission region 11 are both 250 μm. A distance EH11 in the height direction and a distance EW11 in the width direction from the center of the optical transmission region 11 to an edge of the covering part 12 are both 125 μm.

The lens array part 64A has a configuration in which 32 lenses 64Aa are arranged in 8 lines×4 rows corresponding to the arrangement of the optical transmission regions 11 of the multi optical transmission sheet 10CA. A diameter DL1 of the lens 64Aa is 250 μm. Where the width W is 2000 μm and the height H is 1000 μm, the lens array part 64A can be housed in an empty space of about 2 mm×1 mm. At this time, a pitch PH12 in the height direction and a pitch PW12 in the width direction of the lens 64Aa are both 250 μm. A distance EH12 in the height direction and a distance EW12 in the width direction from the center of the lens 64Aa to an edge of the lens array part 64A are both 125 μm.

The multi optical transmission sheet 10CA and the lens array part 64A can implement a data transfer speed of 800 Gbps with one sheet and 1.6 Tbps with two sheets in combination with a VCSEL array the transmission speed of which is 25 Gbps. By further increasing the transmission speed of the VCSEL array from 25 Gbps, and combining a multi-value modulation technique such as Pulse Amplitude Modulation 4 (PAM4) and Quadrature Amplitude Modulation (QAM) with a Wavelength Division Multiplex (WDM) technique, the transmission speed (data transfer speed) that is several to several tens of times higher than the transmission speed described above can be obtained.

Figure 23A:
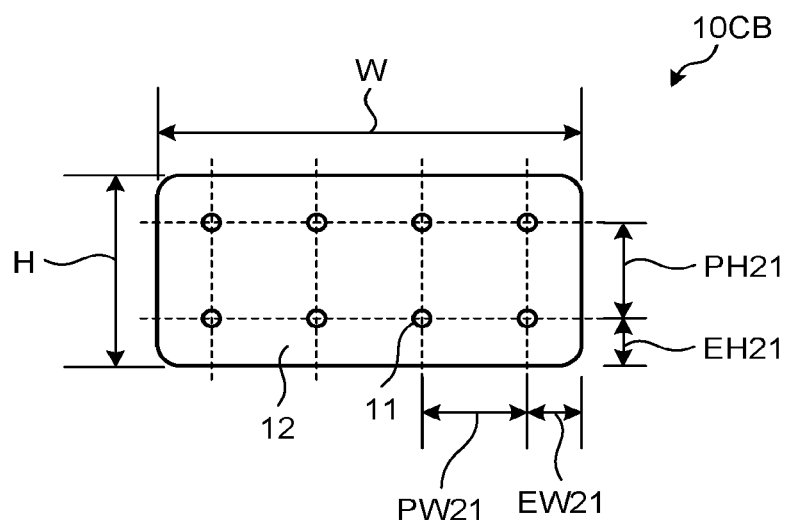
FIG. 23A is a diagram illustrating an exemplary configuration of a multi optical transmission sheet.
Figure 23B:
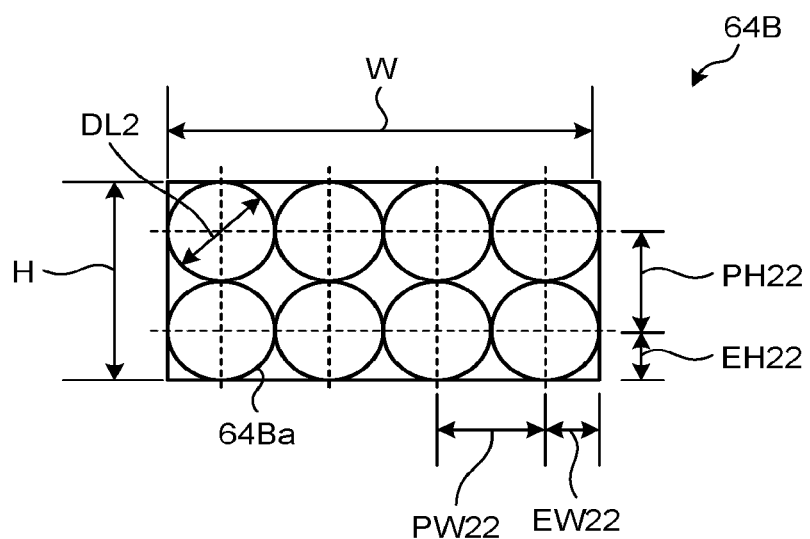
FIG. 23B is a diagram illustrating an exemplary configuration of the lens array part.

FIG. 23A is a diagram illustrating an exemplary configuration of a multi optical transmission sheet 10CB, and FIG. 23B is a diagram illustrating an exemplary configuration of a lens array part 64B.

The multi optical transmission sheet 10CB has a configuration including 8 cores in which 8 optical transmission regions 11 are arranged in 4 lines×2 rows inside the covering part 12. Where the width W is 2000 μm and the height His 1000 µm, the multi optical transmission sheet 10CB can be housed in an empty space of about 2 mm×1 mm. At this time, a pitch PH21 in the height direction and a pitch PW21 in the width direction of the optical transmission region 11 are both 500 µm. A distance EH21 in the height direction and a distance EW21 in the width direction from the center of the optical transmission region 11 to the edge of the covering part 12 are both 250 µm.

The lens array part 64B has a configuration in which 8 lenses 64Ba are arranged in 4 lines×2 rows corresponding to the arrangement of the optical transmission regions 11 of the multi optical transmission sheet 10CB. A diameter DL2 of the lens 64Ba is 500 µm. Where the width W is 2000 µm and the height H is 1000 µm, the lens array part 64B can be housed in an empty space of about 2 mm×1 mm. At this time, a pitch PH22 in the height direction and a pitch PW22 in the width direction of the lens 64Ba are both 500 µm. A distance EH22 in the height direction and a distance EW22 in the width direction from the center of the lens 64Ba to an edge of the lens array part 64B are both 250 µm.

The multi optical transmission sheet 10CB and the lens array part 64B can implement the data transfer speed of 200 Gbps with one sheet and 400 Gbps with two sheets in combination with the VCSEL array the transmission speed of which is 25 Gbps. The diameter DL2 of the lens 64Ba is large, that is, 500 µm, so that a collimation effect for correcting angle deviation or optical axis deviation can be easily obtained. Accordingly, a loss is reduced, and resistance to foreign substances can be easily increased. By further increasing the transmission speed of the VCSEL array from 25 Gbps, and combining the multi-value modulation technique such as PAM4 and QAM with the WDM technique, the transmission speed (data transfer speed) that is several to several tens of times higher than the transmission speed described above can be obtained.

Figure 24A:
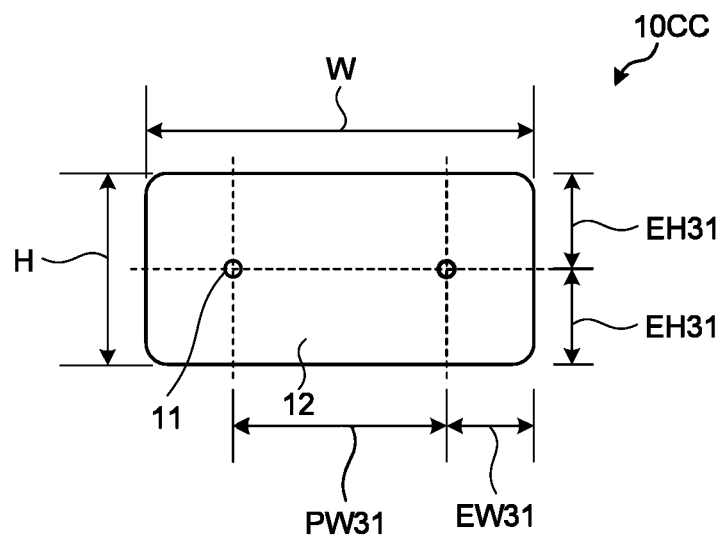
FIG. 24A is a diagram illustrating an exemplary configuration of the multi optical transmission sheet.
Figure 24B:
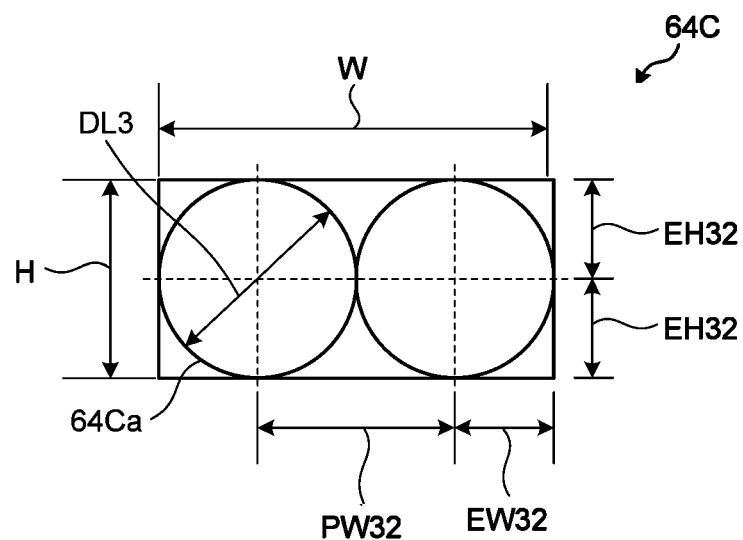
FIG. 24B is a diagram illustrating an exemplary configuration of the lens array part.

FIG. 24A is a diagram illustrating an exemplary configuration of a multi optical transmission sheet 10CC, and FIG. 24B is a diagram illustrating an exemplary configuration of a lens array part 64C.

The multi optical transmission sheet 10CC has a configuration including 2 cores in which two optical transmission regions 11 are arranged in 2 lines×1 row inside the covering part 12. Where the width W is 2000 µm and the height H is 1000 µm, the multi optical transmission sheet 10CC can be housed in an empty space of about 2 mm×1 mm. In this case, a pitch PW31 in the width direction of the optical transmission region 11 is 1000 µm. A distance EH31 in the height direction and a distance EW31 in the width direction from the center of the optical transmission region 11 to the edge of the covering part 12 are both 500 µm.

The lens array part 64C has a configuration in which two lenses 64Ca are arranged in 2 lines×1 row corresponding to the arrangement of the optical transmission regions 11 of the multi optical transmission sheet 10CC. A diameter DL3 of the lens 64Ca is 1000 µm. Where the width W is 2000 µm and the height H is 1000 µm, the lens array part 64C can be housed in an empty space of about 2 mm×1 mm. In this case, a pitch PW32 in the width direction of the lens 64Ca is 1000 µm. A distance EH32 in the height direction and a distance EW32 in the width direction from the center of the lens 64Ca to an edge of the lens array part 64C are both 500 µm.

The multi optical transmission sheet 10CC and the lens array part 64C can implement the data transfer speed of 50 Gbps with one sheet and 100 Gbps with two sheets in combination with the VCSEL array the transmission speed of which is 25 Gbps. The diameter DL3 of the lens 64Ca is further large, that is, 1000 µm, so that the collimation effect for correcting angle deviation or optical axis deviation can be obtained more easily. Accordingly, the loss is further reduced, and the resistance to foreign substances can be increased more easily. By further increasing the transmission speed of the VCSEL array from 25 Gbps, and combining the multi-value modulation technique such as PAM4 and QAM with the WDM technique, the transmission speed (data transfer speed) that is several to several tens of times higher than the transmission speed described above can be obtained. The lens array parts 64A, 64B, and 64C are preferably made of material having transparency that is high to some extent and high hardness at a wavelength (for example, 850 nm) of light transmitted through a corresponding multi optical transmission sheet.

Figure 25A:
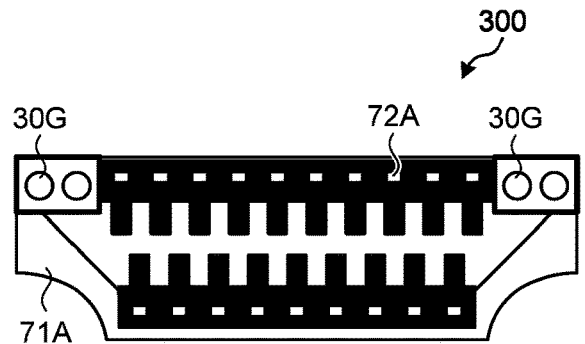
FIG. 25A is a diagram for explaining a configuration of the cable with the connector illustrated in FIG. 20 in a case of using the multi optical transmission sheet illustrated in FIG. 24A and the lens array part illustrated in FIG. 24B, and illustrating a connector end face.
Figure 25B:
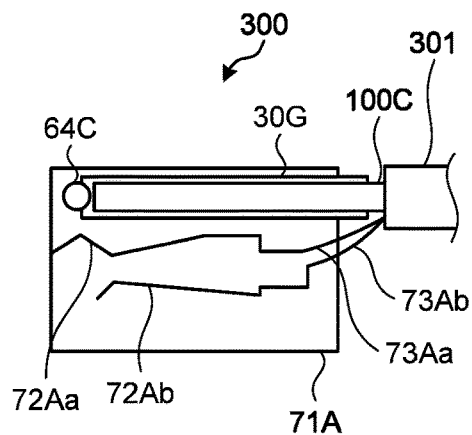
FIG. 25B is a side view for explaining a configuration of the cable with the connector illustrated in FIG. 20 in a case of using the multi optical transmission sheet illustrated in FIG. 24A and the lens array part illustrated in FIG. 24B.
Figure 25C:
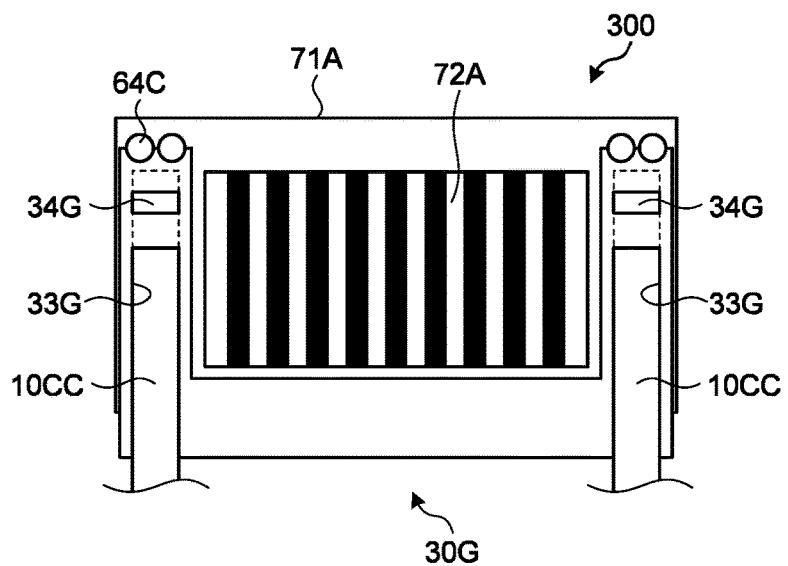
FIG. 25C is a top view for explaining a configuration of the cable with the connector illustrated in FIG. 20 in a case of using the multi optical transmission sheet illustrated in FIG. 24A and the lens array part illustrated in FIG. 24B.

FIGS. 25A to 25C are diagrams for explaining the cable 300 in a case of using the cable 100D including two multi optical transmission sheets 10CC and two lens array parts 64C illustrated in FIGS. 24A and 24B. FIG. 25A is a diagram of a connector end face, FIG. 25B is a side view thereof, and FIG. 25C is a top view thereof.

The cable 100D includes the two multi optical transmission sheets 10CC, a ferrule 30G, and an instant adhesive (not illustrated). At least part of the ferrule 30G is housed in the connector housing 71A.

The ferrule 30G has a U-shape not overlapping with electric contact pins 72Aa and 72Ab of the electric contact pins 72A when viewed from an upper side. The ferrule 30G includes the two lens array parts 64C disposed on a front end surface side, two disposition holes 33G respectively extending toward the lens array parts 64C, and two communication holes 34G respectively communicating with the disposition holes 33G.

The two multi optical transmission sheets 10CC are respectively disposed on the two disposition holes 33G of the ferrule 30G. A stepped part is disposed in the disposition hole 33G similar to the stepped part 33Fd of the ferrule 30F illustrated in FIGS. 19A and 19B, and the stepped part abuts on an end face of the multi optical transmission sheet 10CC. Due to this, each lens of the lens array part 64C is separated from the end face of the multi optical transmission sheet 10CC by the BFL.

The ferrule 30G is preferably made of material having transparency that is high to some extent and high hardness at a wavelength of light transmitted through the multi optical transmission sheet 10CC.

Electric wires 73Aa and 73Ab connected to the electric contact pins 72Aa and 72Ab are individually covered, and is bound together with the two multi optical transmission sheets 10CC and covered to form a cable 301.

The cable 300 can implement a data transfer speed equal to or higher than 100 Gbps by using the cable 100D while keeping interchangeability with an existing cable with an HDMI TYPE-A connector.

By replacing the multi optical transmission sheet 10CC with the multi optical transmission sheet 10CA or 10CB, the data transfer speed can be further increased.

Figure 26:
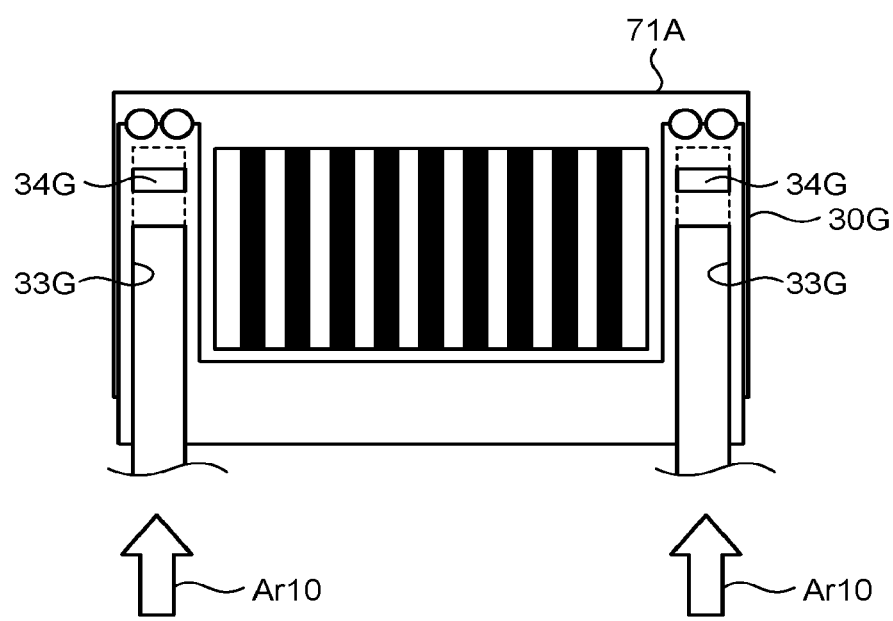
FIG. 26 is an explanatory diagram of an attachment method for the multi optical transmission sheet in FIGS. 25A to 25C.

In a case of manufacturing the cable 300, as illustrated in FIG. 26, after attaching, to the connector housing 71A, the electric contact pins 72Aa and 72Ab to which the electric wires 73Aa and 73Ab are connected and the ferrule 30G, the two multi optical transmission sheets 10CC the distal end surfaces of which are flattened are respectively inserted into the disposition holes 33G to be housed therein as indicated by arrows Ar10.

Subsequently, performed is a step of dripping and supplying the instant adhesive into the communication hole 34G, and bonding the multi optical transmission sheet 10CC to the ferrule 30G to be fixed. Thereafter, the electric wires 73Aa and 73Ab are connected to the electric contact pins 72Aa and 72Ab. However, this connection may be made before attachment of the two multi optical transmission sheets 10CC. In this way, also at the time of manufacturing the cable 300, complicated work is not required, and the working time can be shortened. Furthermore, convenience thereof at a work site is high. Additionally, the cable 300 can prevent damage from being caused by connection or disconnection, so that the cable 300 is appropriate for use in which the number of times of connection and disconnection is large.

After performing the step of bonding the multi optical transmission sheet 10CC to the ferrule 30G, the ferrule 30G may be attached to the connector housing 71A. The ferrule 30G and the connector housing 71A are not necessarily separated from each other, and may be integrated with each other. In this case, the connector housing can be regarded as a housing body.

Figure 27A:
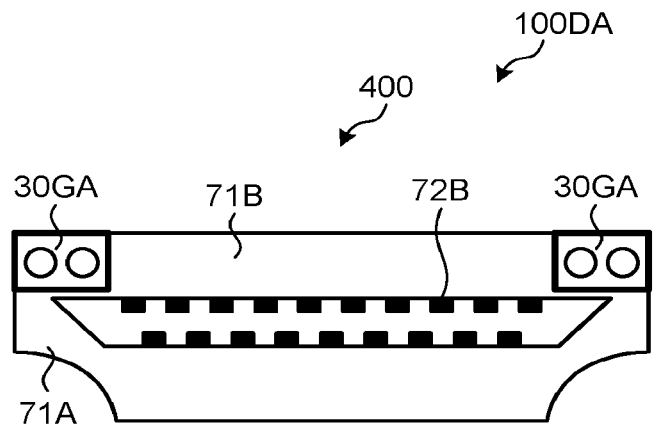
FIG. 27A is a diagram for explaining a configuration of a receptacle corresponding to the cable illustrated in FIGS. 25A to 25C, and illustrating a connector end face.
Figure 27B:
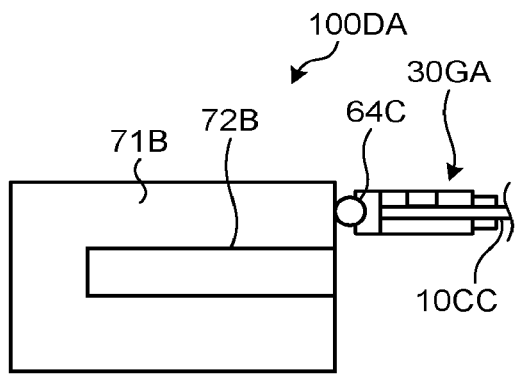
FIG. 27B is a side view for explaining a configuration of the receptacle corresponding to the cable illustrated in FIGS. 25A to 25C.
Figure 27C:
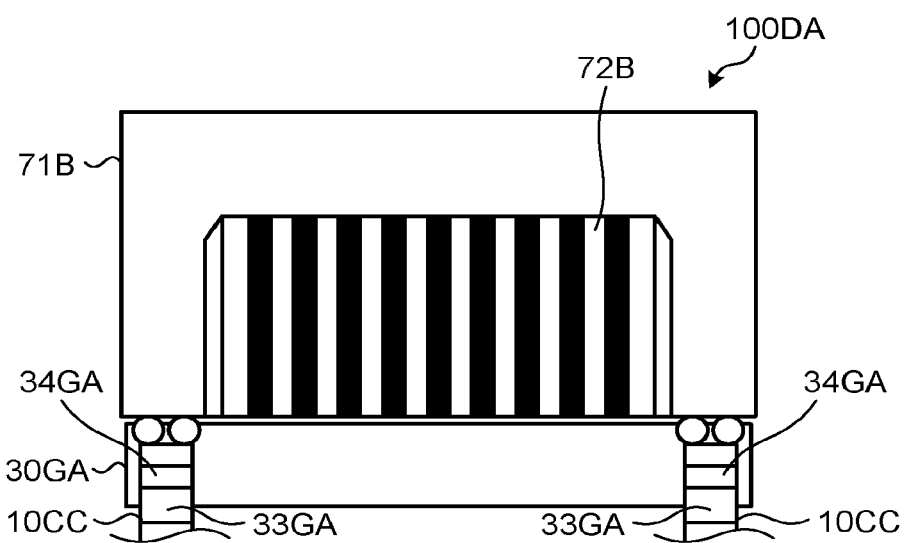
FIG. 27C is a top view for explaining a configuration of the receptacle corresponding to the cable illustrated in FIGS. 25A to 25C.

FIGS. 27A to 27C are diagrams for explaining a configuration of a receptacle corresponding to the cable 100D illustrated in FIG. 26. A receptacle 400 is an example of a batch-molding multi optical transmission sheet assembly, and is a receptacle obtained by integrating an HDMI TYPE-A receptacle with a multi optical transmission sheet cable with a ferrule. FIG. 27A is a diagram of a receptacle end face, FIG. 27B is a side view thereof, and FIG. 27C is a top view thereof.

A cable 100DA includes two multi optical transmission sheets 10CC, a ferrule 30GA, and an instant adhesive (not illustrated). At least part of the ferrule 30GA is housed in a connector housing 71B.

The ferrule 30GA is disposed on the opposite side of an insertion port of the connector housing 71B. The ferrule 30GA includes the two lens array parts 64C disposed on a front end surface side, two disposition holes 33GA respectively extending toward the lens array parts 64C, and two communication holes 34GA respectively communicating with the disposition holes 33GA.

The two multi optical transmission sheets 10CC are respectively disposed in the two disposition holes 33GA of the ferrule 30GA. A stepped part is disposed on the disposition hole 33GA similar to the stepped part 33Fd of the ferrule 30F illustrated in FIGS. 19A and 19B, and the stepped part abuts on the end face of the multi optical transmission sheet 10CC. Due to this, each lens of the lens array part 64C is separated from the end face of the multi optical transmission sheet 10CC by the BFL.

The ferrule 30GA is preferably made of material having transparency that is high to some extent and high hardness at a wavelength of light transmitted through the multi optical transmission sheet 10CC.

An electric wire (not illustrated) is connected to an electric contact pin 72B.

The receptacle 400 can implement the data transfer speed equal to or higher than 100 Gbps while keeping interchangeability with an existing HDMI TYPE-A receptacle.

Also at the time of manufacturing the receptacle 400, complicated work is not required, and the working time can be shortened similar to the cable 300. Furthermore, convenience thereof at a work site is high. Additionally, the receptacle 400 can prevent damage from being caused by connection or disconnection, so that the receptacle 400 is appropriate for use in which the number of times of connection and disconnection is large.

Tenth and Eleventh Embodiments

The configuration into which the multi optical transmission sheet cable with the ferrule is incorporated as described in the ninth embodiment is not limited to an HDMI type cable, and can be applied to various cables for communication.

Figure 28:
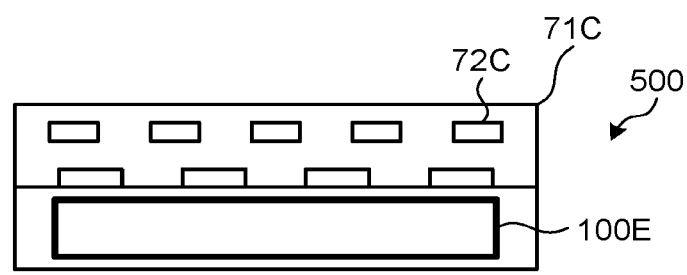
FIG. 28 is a diagram illustrating a connector end face of a cable with a connector according to a tenth embodiment.

For example, FIG. 28 is a diagram illustrating a connector end face of a cable with a connector according to a tenth embodiment. A cable 500 as the cable with the connector is an example of a batch-molding multi optical transmission sheet assembly, and is a cable for communication obtained by integrating a Universal Serial Bus (USB) TYPE-A cable with a multi optical transmission sheet cable with a ferrule.

A connector housing 71C is configured as a plug, and houses a plurality of electric contact pins 72C that are arranged in accordance with the USB standard (for example, USB 1.0 to 3.2). Additionally, in the connector housing 71C, a cable 100E as a multi optical transmission sheet cable with a ferrule is disposed in an empty space in which the electric contact pins 72C are not disposed. The size of the cable 100E at a connector end face is substantially represented as width 10 mm×height 1 mm.

The cable 100E includes a multi optical transmission sheet having the same configuration as that of the multi optical transmission sheets 10CA to 10CC, and a ferrule including a lens array part having the same configuration as that of the lens array parts 64A to 64C.

The cable 500 can implement the transmission speed equal to or higher than 100 Gbps using the cable 100E while keeping interchangeability with an existing cable with a USB TYPE-A connector.

Figure 29:
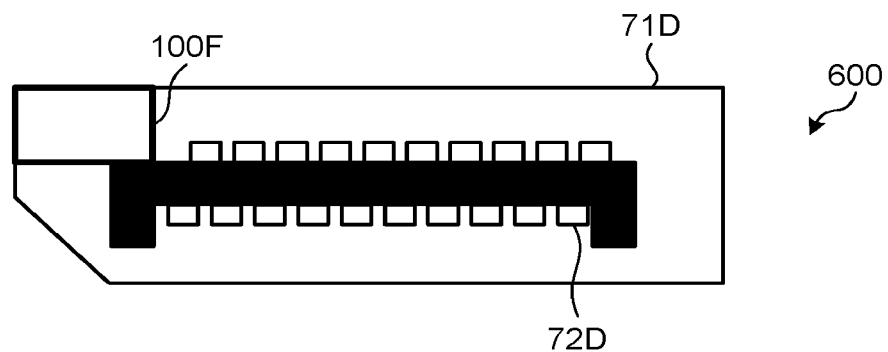
FIG. 29 is a diagram illustrating a connector end face of a cable with a connector according to an eleventh embodiment.

FIG. 29 is a diagram illustrating a connector end face of a cable with a connector according to an eleventh embodiment. A cable 600 as the cable with the connector is an example of a batch-molding multi optical transmission sheet assembly, and is a cable for communication obtained by integrating a Displayport cable with a multi optical transmission sheet cable with a ferrule.

A connector housing 71D is configured as a plug, and houses a plurality of electric contact pins 72D that are arranged in accordance with DisplayPort standard (for example, DisplayPort 1.0 to 2.0) of Video Electronics Standards Association (VESA). Additionally, in the connector housing 71D, a cable 100F as a multi optical transmission sheet cable with a ferrule is disposed in an empty space in which the electric contact pins 72D are not disposed. The size of the cable 100F at the connector end face is about width 2 mm×height 1 mm.

The cable 100F includes a multi optical transmission sheet having the same configuration as that of the multi optical transmission sheets 10CA to 10CC, and a ferrule including a lens array part having the same configuration as that of the lens array parts 64A to 64C.

The cable 600 can implement the transmission speed equal to or higher than 100 Gbps using the cable 100F while keeping interchangeability with an existing cable with a DisplayPort connector.

Each of the connectors of the cables 500 and 600 illustrated in FIGS. 28 and 29 is configured as a plug, but can also be configured as a receptacle.

As a cable for communication into which a multi optical transmission sheet cable with a ferrule is incorporated, a cable for communication compatible with various other standards can be configured. Examples of the standards include USB4 TYPE-C, THUNDERBOLT (registered trademark) 1.0 to 3.0, Mini-DisplayPort, USB TYPE-C, and Ethernet (registered trademark).

Twelfth Embodiment

Figure 30:
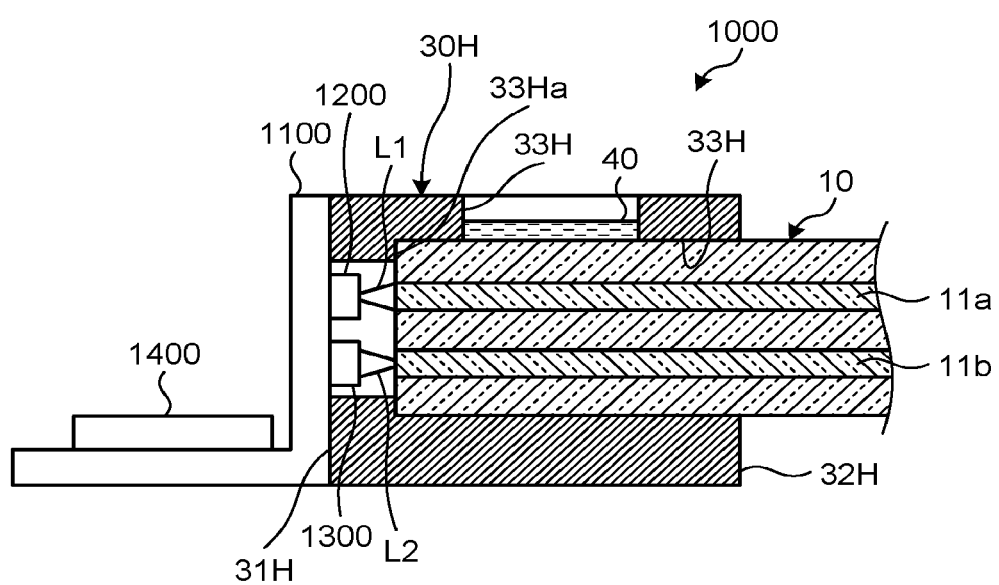
FIG. 30 is a schematic partially cut-off side view of an optical module according to a twelfth embodiment.

FIG. 30 is a schematic partially cut-off side view of an optical module according to a twelfth embodiment. An optical module 1000 includes the multi optical transmission sheet 10, a housing 30H as a housing body, the instant adhesive 40, a substrate 1100, a light emitting element array 1200 in which light emitting elements as photoelectric elements are arranged in one-dimensional array, a light receiving element array 1300 in which light receiving elements as photoelectric elements are arranged in one-dimensional array, and an electric circuit 1400.

The substrate 1100 is an electronic substrate having an L-shaped frame shape on which the light emitting element array 1200, the light receiving element array 1300, and the electric circuit 1400 are mounted. On the substrate 1100, a wiring pattern is provided for electrically connecting the light emitting element array 1200, the light receiving element array 1300, and the electric circuit 1400 to each other.

In the light emitting element array 1200, 16 light emitting elements as photoelectric elements are arranged in one-dimensional array in a direction vertical to the drawing. The light emitting element is, for example, a laser diode such as a VCSEL. In the light receiving element array 1300, 16 light receiving elements as photoelectric elements are arranged in one-dimensional array in a direction vertical to the drawing. The light receiving element is, for example, a photodiode. The electric circuit 1400 includes a driver IC as an electric circuit for driving and controlling the light emitting element array 1200, and an amplification IC as an electric circuit for amplifying a current signal output from the light receiving element array 1300.

The housing 30H includes a front end surface 31H, a rear end surface 32H, a disposition hole 33H passing through between the front end surface 31H and the rear end surface 32H, and a communication hole 34H communicating with the disposition hole 33H. The housing 30H can be made of a well-known thermoplastic resin, as material, that is suitable for injection molding, and excellent in heat resistance.

In the multi optical transmission sheet 10, the optical transmission region 11a is an optical transmission region in an upper row, and the optical transmission region 11b is an optical transmission region in a lower row. In each row, 16 optical transmission regions are arranged in a direction vertical to the drawing.

A stepped part 33Ha is formed on the front end surface 31H side of the disposition hole 33H. An inner shape of the disposition hole 33H on the rear end surface 32H side from the stepped part 33Ha substantially matches the outer shape of the cross section of the multi optical transmission sheet 10, and has rounded corners, for example. At least one end part of the multi optical transmission sheet 10 is housed in the disposition hole 33H. In a housed state, the end face of the multi optical transmission sheet 10 abuts on the stepped part 33Ha.

The instant adhesive 40 bonds the multi optical transmission sheet 10 to the housing 30H. The instant adhesive 40 is positioned at least in the communication hole 34H.

A surface of the substrate 1100 on which the light emitting element array 1200 and the light receiving element array 1300 are mounted abuts on the front end surface 31H of the housing 30H. The light emitting element array 1200 and the light receiving element array 1300 are housed in the disposition hole 33H.

Each light emitting element of the light emitting element array 1200 is disposed to be opposed to each of the optical transmission regions 11a of the multi optical transmission sheet 10, and is optically connected thereto. Each light receiving element of the light receiving element array 1300 is disposed to be opposed to each of the optical transmission regions 11b of the multi optical transmission sheet 10, and is optically connected thereto. Position accuracy of the light emitting elements of the light emitting element array 1200 and the respective optical transmission regions 11a, and position accuracy of the light receiving elements of the light receiving element array 1300 and the respective optical transmission regions 11b can be implemented as accuracy of several micrometers or less with respect to design.

The optical module 1000 functions as an optical transceiver. That is, the light emitting element array 1200 is driven and controlled by the electric circuit 1400, and each light emitting element outputs signal light L1 to the optical transmission region 11a. On the other hand, in the light receiving element array 1300, each light receiving element receives signal light L2 output from the optical transmission region 11b to be converted into a current signal, and outputs the current signal to the electric circuit 1400.

Next, the following describes a manufacturing method for the optical module 1000. First, the substrate 1100 on which the light emitting element array 1200, the light receiving element array 1300, and the electric circuit 1400 are mounted is fixed to the housing 30H using an adhesive, a screw, and the like with high accuracy corresponding to guide pins or the like.

Figure 31A:
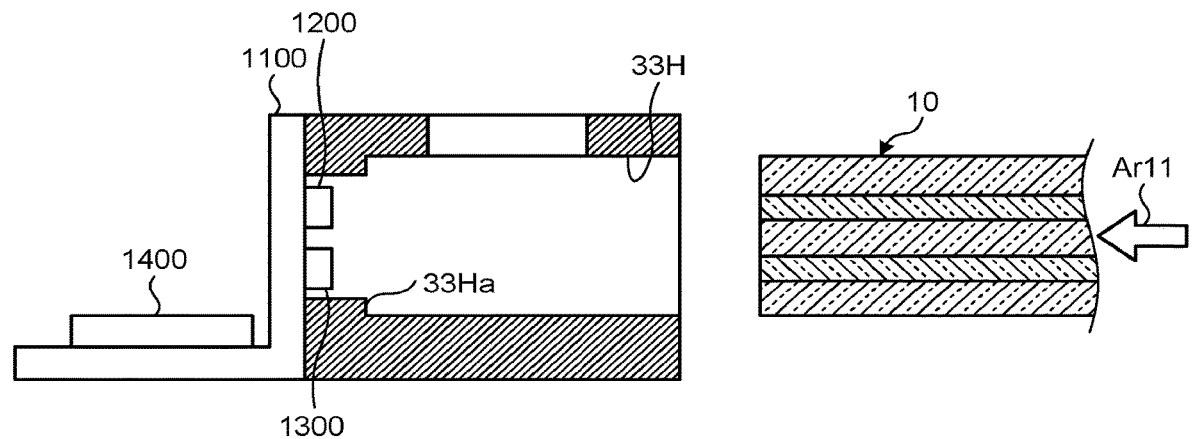
FIG. 31A is an explanatory diagram of one step of an assembly method for the optical module illustrated in FIG. 30.

Subsequently, as indicated by arrow Ar11 in FIG. 31A, the multi optical transmission sheet 10 in which a part having a predetermined length is cut off from the end face with the cutting tool C or the like to flatten the end face is inserted into the disposition hole 33H to abut on the stepped part 33Ha from the rear end surface 32H side of the housing 30H, and housed therein. Due to the stepped part 33Ha, a distance between each of the light emitting element array 1200 and the light receiving element array 1300, and the end face of the multi optical transmission sheet 10 is caused to be an appropriate distance.

Figure 31B:
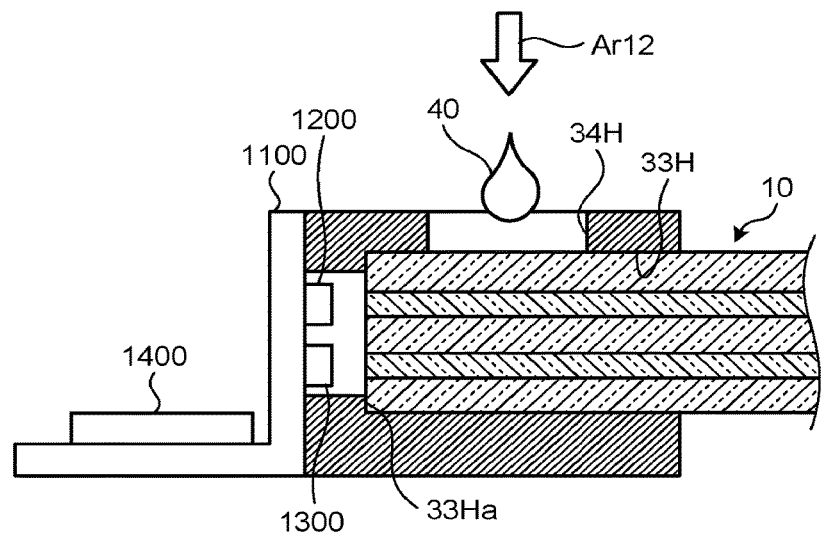
FIG. 31B is an explanatory diagram of a step subsequent to FIG. 31A of the assembly method for the optical module illustrated in FIG. 30.

Subsequently, as indicated by arrow Ar12 in FIG. 31B, the instant adhesive 40 is dripped and supplied into the communication hole 34H to bond the multi optical transmission sheet 10 to the housing 30H. At this time, the instant adhesive 40 may pass through a gap between the multi optical transmission sheet 10 and an inner wall of the disposition hole 33H to flow to the opposite side of the communication hole 34H.

At the time of manufacturing the optical module 1000, unlike the conventional tape cores, complicated work of removing the resin tape layer and the batch covering layer, extracting the optical fibers, and inserting the optical fibers into respective optical fiber insertion holes of the ferrule one by one is not required. Additionally, fixing is performed with the instant adhesive 40, so that working time can also be shortened.

Furthermore, the multi optical transmission sheet 10 can be easily attached by a simple and inexpensive tool such as the cutting tool C. Accordingly, convenience thereof at a work site is high.

In the optical module 1000, the number of rows of arrays of photoelectric elements and the optical transmission regions of the multi optical transmission sheet 10 is two, but the number of rows may be replaced with one, or three or more. The light emitting elements and the light receiving elements can be mounted on one surface or both surfaces of the substrate 1100. Regarding disposition thereof, arrays are not necessarily arranged in two rows, that is, upper and lower rows, but can be freely arranged in accordance with a system to be applied.

Thirteenth Embodiment

Figure 32:
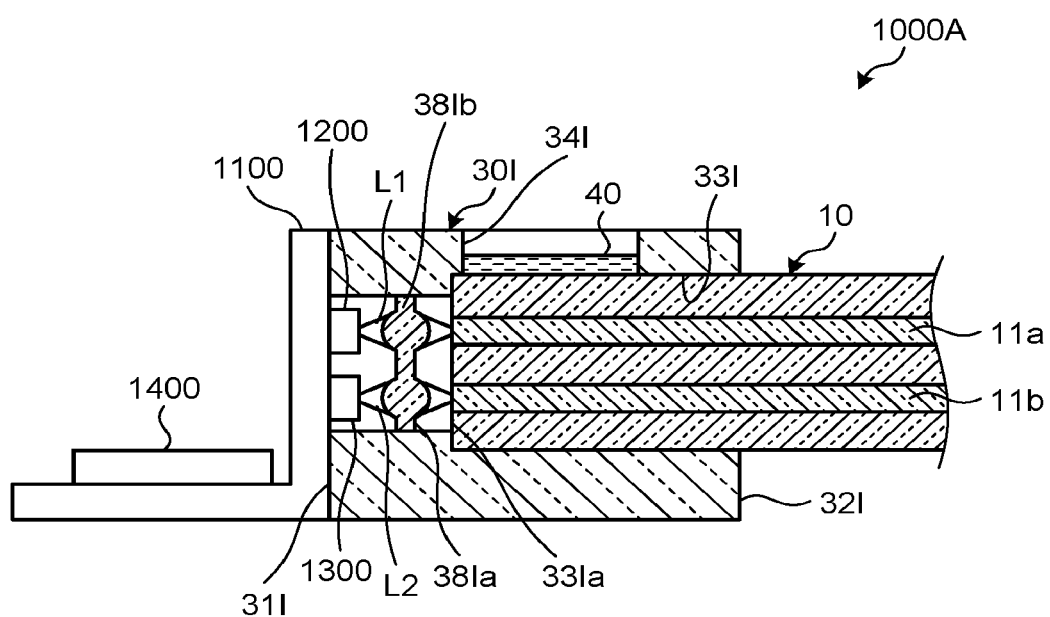
FIG. 32 is a schematic partially cut-off side view of an optical module according to a thirteenth embodiment.

FIG. 32 is a schematic partially cut-off side view of an optical module according to a thirteenth embodiment. An optical module 1000A includes the multi optical transmission sheet 10, a housing 30I as a housing body, the instant adhesive 40, the substrate 1100, the light emitting element array 1200, the light receiving element array 1300, and the electric circuit 1400.

The substrate 1100, the light emitting element array 1200, the light receiving element array 1300, and the electric circuit 1400 are the same as the corresponding elements illustrated in FIG. 30, so that description thereof will not be repeated herein.

The housing 30I includes a front end surface 31I, a rear end surface 32I, a disposition hole 33I passing through between the front end surface 31I and the rear end surface 32I, a communication hole 34I communicating with the disposition hole 33I, and a lens array part 38I integrated with the housing 30I. The housing 30I including the lens array part 38I is preferably made of material having transparency that is high to some extent and high hardness at a wavelength of light transmitted through the multi optical transmission sheet 10 (for example, 850 nm).

A stepped part 33Ia is formed on the front end surface 31I side of the disposition hole 33I. An inner shape of the disposition hole 33I on the rear end surface 32I side from the stepped part 33Ia substantially matches the outer shape of the cross section of the multi optical transmission sheet 10, and has rounded corners, for example. At least one end part of the multi optical transmission sheet 10 is housed in the disposition hole 33I. In a housed state, the end face of the multi optical transmission sheet 10 abuts on the stepped part 33Ia.

The lens array part 38I is positioned between the front end surface 31I and the stepped part 33Ia. The lens array part 38I includes a supporting part 38Ia and a lens array 38Ib. The supporting part 38Ia is a stick-shaped or plate-shaped portion extending from an inner wall of the disposition hole 33I, and supports the lens array 38Ib. The lens array 38Ib is constituted of lenses that are disposed corresponding to the disposition of the optical transmission regions of the multi optical transmission sheet 10. Thus, the lens array 38Ib is constituted of 32 lenses.

The instant adhesive 40 bonds the multi optical transmission sheet 10 to the housing 30I. The instant adhesive 40 is positioned at least in the communication hole 34I.

A surface of the substrate 1100 on which the light emitting element array 1200 and the light receiving element array 1300 are mounted abuts on the front end surface 31H of the housing 30H. The light emitting element array 1200 and the light receiving element array 1300 are housed in the disposition hole 33H.

Each light emitting element of the light emitting element array 1200 is disposed to be opposed to each of the optical transmission regions 11a of the multi optical transmission sheet 10, and is optically connected thereto. Each light receiving element of the light receiving element array 1300 is disposed to be opposed to each of the optical transmission regions 11b of the multi optical transmission sheet 10, and is optically connected thereto.

Additionally, each lens of the lens array 38Ib is disposed between the light emitting element and the optical transmission region 11a that are disposed to be opposed to each other, and between the light receiving element and the optical transmission region 11b that are disposed to be opposed to each other. Position accuracy between each light emitting element of the light emitting element array 1200, the respective optical transmission regions 11a, and the lenses, and position accuracy between each light receiving element of the light receiving element array 1300, the respective optical transmission regions 11b, and the lenses can be implemented to be accuracy of several micrometers or less with respect to design.

The optical module 1000A functions as an optical transceiver. That is, the light emitting element array 1200 is driven and controlled by the electric circuit 1400, and each light emitting element outputs the signal light L1. Pieces of the signal light L1 are respectively collected by the lenses to be output to the optical transmission regions 11a. On the other hand, in the light receiving element array 1300, each light receiving element receives the signal light L2 that is output from the optical transmission region 11b and collected by the lens to be converted into a current signal, and outputs the current signal to the electric circuit 1400.

Next, the following describes a manufacturing method for the optical module 1000A. First, the substrate 1100 on which the light emitting element array 1200, the light receiving element array 1300, and the electric circuit 1400 are mounted is fixed to the housing 30I using an adhesive, a screw, and the like with high accuracy corresponding to guide pins or the like.

Figure 33A:
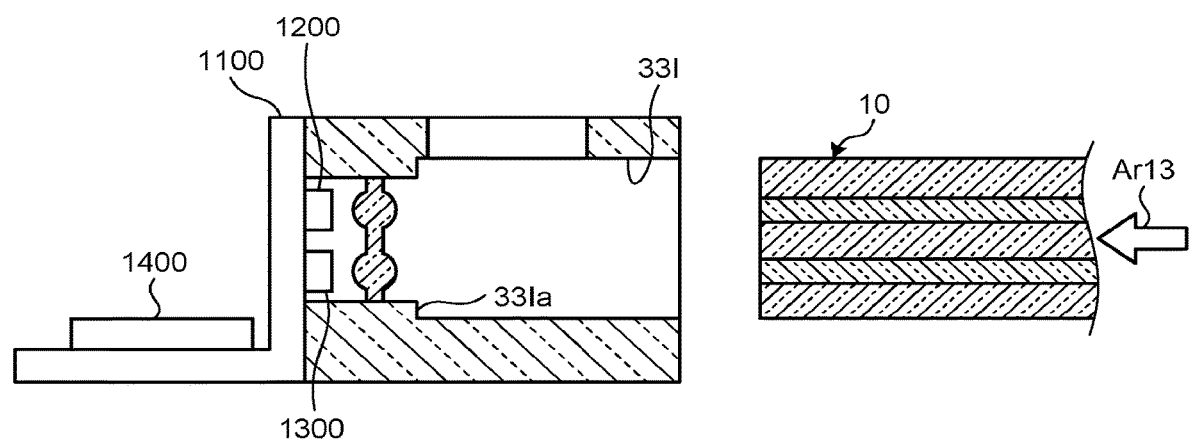
FIG. 33A is an explanatory diagram of one step of an assembly method for the optical module according to FIG. 32.

Subsequently, as indicated by arrow Ar13 in FIG. 33A, the multi optical transmission sheet 10 in which a part having a predetermined length is cut off from the end face with the cutting tool C or the like to flatten the end face is inserted into the disposition hole 33I to abut on the stepped part 33Ia from the rear end surface 32I side of the housing 30I, and housed therein. Due to the stepped part 33Ia, a distance among each of the light emitting element array 1200 and the light receiving element array 1300, the lens array 38Ib, and the end face of the multi optical transmission sheet 10 is caused to be an appropriate distance.

Figure 33B:
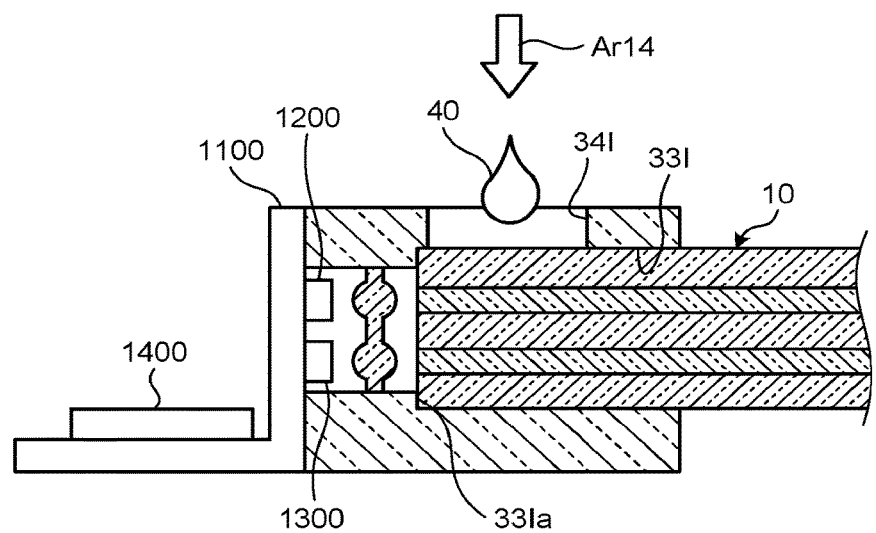
FIG. 33B is an explanatory diagram of a step subsequent to FIG. 33A of the assembly method for the optical module according to FIG. 32.

Subsequently, as indicated by arrow Ar14 in FIG. 33B, the instant adhesive 40 is dripped and supplied into the communication hole 34I to bond the multi optical transmission sheet 10 to the housing 30I. At this time, the instant adhesive 40 may pass through a gap between the multi optical transmission sheet 10 and an inner wall of the disposition hole 33I to flow to the opposite side of the communication hole 34I.

At the time of manufacturing the optical module 1000A, complicated work is not required, the working time can be shortened, and convenience at a work site is high.

Additionally, the optical module 1000A includes the lens array part 38I, so that the connection loss of the multi optical transmission sheet 10, and the light emitting element array 1200 and the light receiving element array 1300 is reduced.

In the optical module 1000A, the number of rows of arrays of photoelectric elements, and the number of rows of optical transmission regions and the lens arrays of the multi optical transmission sheet 10 is two, but the number of rows may be replaced with one, or three or more. The number of lenses can be one to several hundreds or more.

The light emitting elements and the light receiving elements can be mounted on one surface or both surfaces of the substrate 1100A. Regarding disposition thereof, arrays are not necessarily arranged in two rows, that is, upper and lower rows, but can be freely arranged in accordance with a system to be applied.

Fourteenth Embodiment

Figure 34:
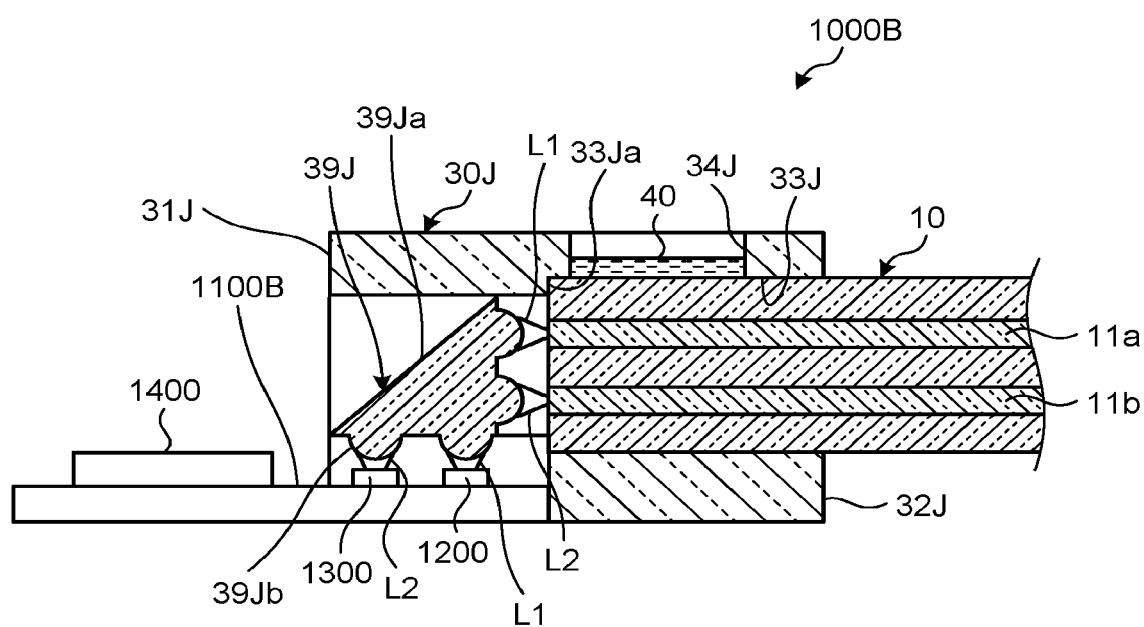
FIG. 34 is a schematic partially cut-off side view of an optical module according to a fourteenth embodiment.

FIG. 34 is a schematic partially cut-off side view of an optical module according to a fourteenth embodiment. An optical module 1000B includes the multi optical transmission sheet 10, a housing 30J as a housing body, the instant adhesive 40, a substrate 1100B, the light emitting element array 1200, the light receiving element array 1300, and the electric circuit 1400.

The light emitting element array 1200, the light receiving element array 1300, and the electric circuit 1400 are the same as corresponding elements illustrated in FIG. 30, so that description thereof will not be repeated herein. The substrate 1100B is an electronic substrate having a flat plate shape on which the light emitting element array 1200, the light receiving element array 1300, and the electric circuit 1400 are mounted. A wiring pattern is disposed on the substrate 1100B for electrically connecting the light emitting element array 1200, the light receiving element array 1300, and the electric circuit 1400 to each other.

The housing 30J includes a front end surface 31J, a rear end surface 32J, a disposition hole 33J passing through between the front end surface 31J and the rear end surface 32J, a communication hole 34J communicating with the disposition hole 33J, and a prism 39J with a lens array integrated with the housing 30J. The housing 30J including the prism 39J with the lens array is preferably made of material having transparency that is high to some extent and high hardness at a wavelength of light transmitted through the multi optical transmission sheet 10 (for example, 850 nm).

A stepped part 33Ja is formed on the front end surface 31J side of the disposition hole 33J. An inner shape of the disposition hole 33J on the rear end surface 32J side from the stepped part 33Ja substantially matches the outer shape of the cross section of the multi optical transmission sheet 10, and has rounded corners, for example. At least one end part of the multi optical transmission sheet 10 is housed in the disposition hole 33J. In a housed state, the end face of the multi optical transmission sheet 10 abuts on the stepped part 33Ja.

The prism 39J with the lens array is an optical coupler, and is disposed between the front end surface 31J and the stepped part 33Ja. The prism 39J with the lens array includes a prism 39Ja and a lens array 39Jb. The lens array 39Jb is disposed on a surface facing an oblique surface of the prism 39Ja. The lens array 39Jb is constituted of lenses that are disposed corresponding to disposition of the optical transmission regions 11a and 11b of the multi optical transmission sheet 10, and lenses that are disposed corresponding to disposition of the light emitting element array 1200 and the light receiving element array 1300. Thus, the lens array 39Jb is constituted of 64 lenses.

The instant adhesive 40 bonds the multi optical transmission sheet 10 to the housing 30J. The instant adhesive 40 is positioned at least in the communication hole 34J.

A portion of the substrate 1100B on which the light emitting element array 1200 and the light receiving element array 1300 are mounted is attached to the housing 30J. The light emitting element array 1200 and the light receiving element array 1300 are housed in the disposition hole 33J.

The optical module 1000B functions as an optical transceiver. That is, the light emitting element array 1200 is driven and controlled by the electric circuit 1400, and each light emitting element outputs the signal light L1. Each piece of the signal light L1 is collimated by a corresponding lens of the lens array 39Jb first, an optical path thereof is changed by about 90 degrees by the prism 39Ja, and the signal light L1 is collected by the corresponding lens of the lens array 39Jb to be output to the optical transmission region 11a. On the other hand, the light receiving element array 1300 receives pieces of the signal light L2 to be converted into a current signal, and outputs the current signal to the electric circuit 1400, the signal light L2 that is output from the optical transmission region 11b, is collimated by the corresponding lens of the lens array 39Jb, has the optical path that is changed by about 90 degrees by the prism 39Ja, and is collected by the corresponding lens of the lens array 39Jb.

That is, each light emitting element of the light emitting element array 1200 is optically connected to each of the optical transmission regions 11a of the multi optical transmission sheet 10 via the prism 39J with a lens array. Each light receiving element of the light receiving element array 1300 is optically connected to each of the optical transmission regions 11b of the multi optical transmission sheet 10 via the prism 39J with the lens array. Position accuracy of the light emitting elements of the light emitting element array 1200, the respective optical transmission regions 11a, and the prism 39J with the lens array, and position accuracy of the light receiving elements of the light receiving element array 1300, the respective optical transmission regions 11b, and the prism 39J with the lens array can be implemented to be accuracy of several micrometers or less with respect to design.

Next, the following describes a manufacturing method for the optical module 1000B. First, the substrate 1100B on which the light emitting element array 1200, the light receiving element array 1300, and the electric circuit 1400 are mounted is fixed to the housing 30J using an adhesive, a screw, and the like with high accuracy corresponding to guide pins or the like.

Figure 35A:
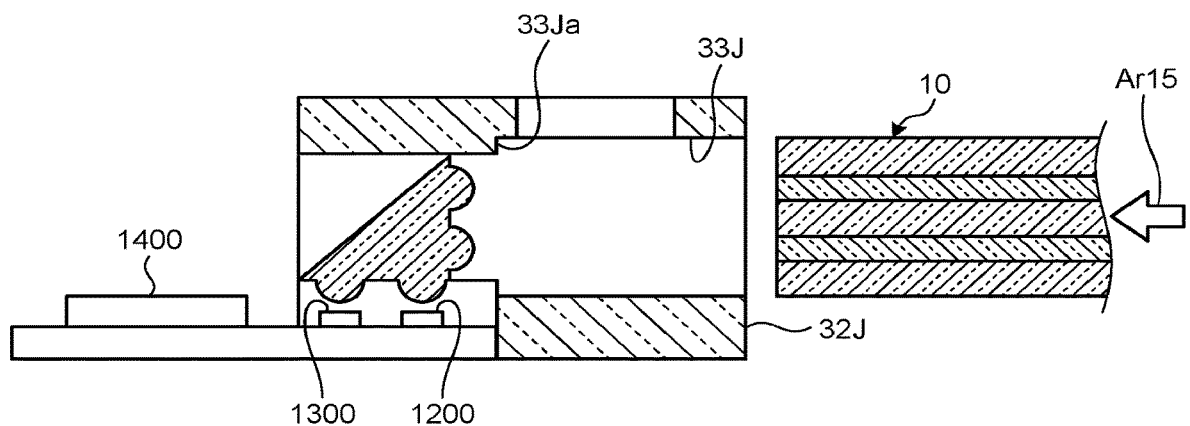
FIG. 35A is an explanatory diagram of one step of an assembly method for the optical module according to FIG. 34.

Subsequently, as indicated by arrow Ar15 in FIG. 35A, the multi optical transmission sheet 10 in which a part having a predetermined length is cut off from the end face with the cutting tool C or the like to flatten the end face is inserted into the disposition hole 33J to abut on the stepped part 33Ja from the rear end surface 32J side of the housing 30J, and housed therein. Due to the stepped part 33Ja, a distance between each of the light emitting element array 1200 and the light receiving element array 1300, the prism 39J with the lens array, and the end face of the multi optical transmission sheet 10 is caused to be an appropriate distance.

Figure 35B:
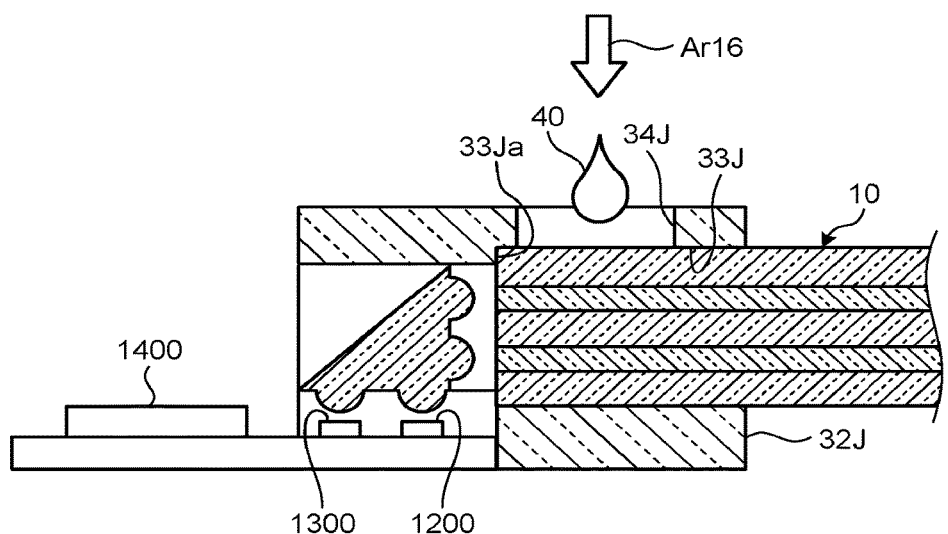
FIG. 35B is an explanatory diagram of a step subsequent to FIG. 35A of the assembly method for the optical module according to FIG. 34.

Subsequently, as indicated by arrow Ar16 in FIG. 35B, the instant adhesive 40 is dripped and supplied into the communication hole 34J to bond the multi optical transmission sheet 10 to the housing 30J. At this time, the instant adhesive 40 may pass through a gap between the multi optical transmission sheet 10 and an inner wall of the disposition hole 33J to flow to the opposite side of the communication hole 34J.

At the time of manufacturing the optical module 1000B, complicated work is not required, the working time can be shortened, and convenience at a work site is high.

Additionally, the optical module 1000B includes the lens array 39Jb, so that the connection loss of the multi optical transmission sheet 10, and the light emitting element array 1200 and the light receiving element array 1300 is reduced. Furthermore, by bending the optical path by the prism 39Ja, the light emitting element array 1200, the light receiving element array 1300, and the electric circuit 1400 can be mounted on the substrate 1100B having a flat plate shape. Due to this, it is possible to cause a high-frequency characteristic of an electric signal between the light emitting element array 1200 and the electric circuit 1400, and between the light receiving element array 1300 and the electric circuit 1400 to be favorable.

In the optical module 1000B, the number of rows of arrays of photoelectric elements, and the number of rows of optical transmission regions and the lens arrays of the multi optical transmission sheet 10 is two, but the number of rows may be replaced with one, or three or more. The number of lenses can be one to several hundreds or more. The light emitting elements and the light receiving elements can be mounted on one surface or both surfaces of the substrate 1100B. Regarding disposition thereof, arrays are not necessarily arranged in two rows, but can be freely arranged in accordance with a system to be applied.

In the optical module 1000B, the optical path is changed by about 90 degrees by the prism 39Ja, for example. A bend loss of the multi optical transmission sheet 10 is smaller than that of a glass-based optical fiber. Thus, the multi optical transmission sheet 10 may be bent without using the prism. For example, the multi optical transmission sheet 10 may be disposed so that the end face of the multi optical transmission sheet 10 is opposed to the light emitting element array 1200 and the light receiving element array 1300, and the multi optical transmission sheet 10 may be bent by about 90 degrees, for example, on a side distant from the end face and the substrate 1100B to cause the multi optical transmission sheet 10 to extend in a direction parallel with a mounting surface of the substrate 1100B. In this case, a lens array unit or a lens array part is disposed between the end face of the multi optical transmission sheet 10, and the light emitting element array 1200 and the light receiving element array 1300. For example, the disposition hole of the housing may extend in a direction vertical to the mounting surface of the substrate 1100B, and part of the end part of the multi optical transmission sheet 10 may be housed in the disposition hole. The communication hole may be disposed to communicate with the disposition hole from a lateral side of the communication hole with respect to the disposition hole and the housing, and the instant adhesive may be supplied to the communication hole from a lateral side of the housing. The portion of the multi optical transmission sheet 10 that is bent by about 90 degrees may be housed in the disposition hole of the housing, or may be disposed outside the disposition hole, and the multi optical transmission sheet 10 may be supported by a supporting structure disposed in the housing so that a bent shape is maintained.

Fifteenth Embodiment

Figure 36:
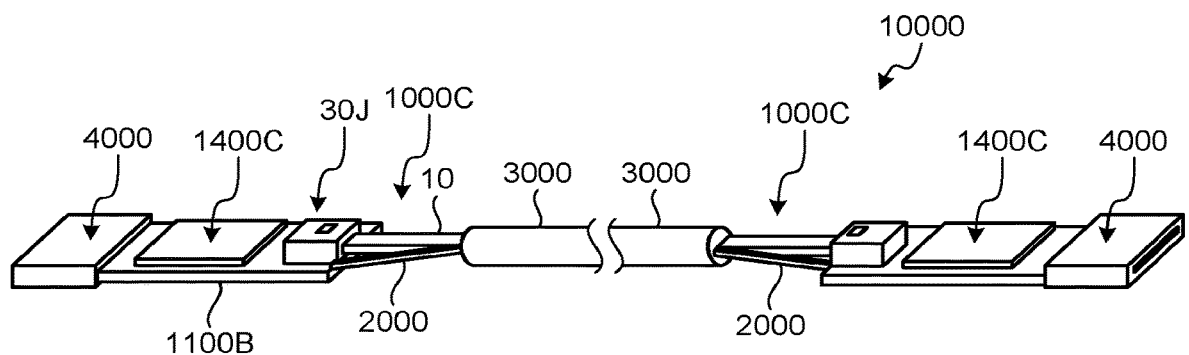
FIG. 36 is a schematic partially cut-off side view of an active optical cable according to a fifteenth embodiment.

FIG. 36 is a schematic partially cut-off side view of an active optical cable (AOC) according to a fifteenth embodiment. An active optical cable 10000 includes two optical modules 1000C, an electric wire 2000, a covering 3000, and two electric connectors 4000.

The optical module 1000C has a configuration obtained by replacing the electric circuit 1400 of the optical module 1000B illustrated in FIG. 34 with an electric circuit 1400C. The electric circuit 1400C includes an LSI including the configuration of the electric circuit 1400, for example, and performs various kinds of signal processing. On the substrate 1100B, the light emitting element array 1200, the light receiving element array 1300, and the electric circuit 1400C are mounted, and a wiring pattern is disposed for electrically connecting the light emitting element array 1200, the light receiving element array 1300, and the electric circuit 1400C to each other. The electric wire 2000 and the electric connector 4000 are attached to the substrate 1100B, and a wiring pattern is disposed on the substrate 1100B for electrically connecting the light emitting element array 1200, the light receiving element array 1300, the electric circuit 1400C, the electric wire 2000, and an electric connector pin of the electric connector 4000 to each other.

The electric connector 4000 is a connector conforming to a predetermined standard for communication such as HDMI, USB, DisplayPort, and Ethernet, for example.

The two optical modules 1000C share the multi optical transmission sheet 10. The multi optical transmission sheet 10 and the electric wire 2000 are bound together and covered by the covering 3000.

The following describes a function of the active optical cable 10000. One of the electric connectors 4000 outputs, when an electric signal is input thereto, the electric signal to the electric circuit 1400C through the wiring pattern on the substrate 1100B of the optical module 1000C. The electric circuit 1400C performs signal processing such as modulation for optically transmitting the electric signal as signal light by the light emitting element array 1200. This signal processing may include multiplexing of a plurality of electric signals. The electric circuit 1400C outputs the electric signal generated by the signal processing to the light emitting element array 1200. The light emitting element array 1200 outputs the signal light to the multi optical transmission sheet 10 based on the electric signal. The multi optical transmission sheet 10 transmits the signal light to the other optical module 1000C. In the other optical module 1000C, the light receiving element array 1300 receives the transmitted signal light to be converted into an electric signal, and outputs the electric signal to the electric circuit 1400C. The electric circuit 1400C performs signal processing such as demodulation on the electric signal. This signal processing may include separation of multiplexed electric signals. The electric signal generated by the signal processing is output from the other electric connector 4000. The optical module 1000C is configured as an optical transceiver, so that the active optical cable 10000 can perform bidirectional communication.

The active optical cable 10000 converts an electric signal of HDMI or the like into signal light to be transmitted through the multi optical transmission sheet 10, so that the active optical cable 10000 can perform long-distance transmission while suppressing deterioration of signals as compared with existing electric cables. The active optical cable 10000 also includes the electric wire 2000, so that the active optical cable 10000 can transmit the electric signal as it is, that is, a transmission scheme can be selected.

Next, the following describes a manufacturing method for the active optical cable 10000. First, the substrate 1100B on which the light emitting element array 1200, the light receiving element array 1300, and the electric circuit 1400C are mounted is fixed to the housing 30J, and the electric connector 4000 is attached to the substrate 1100B.

Figure 37A:
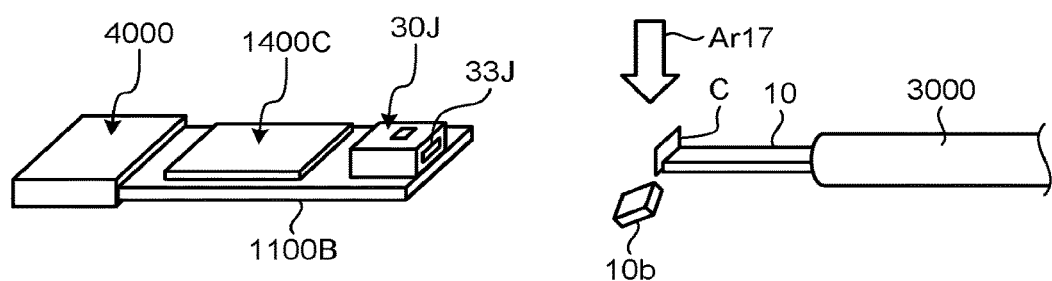
FIG. 37A is an explanatory diagram of one step of an assembly method for the active optical cable according to FIG. 36.

Subsequently, as indicated by arrow Ar17 in FIG. 37A, the multi optical transmission sheet 10 in which the part 10b having a predetermined length is cut off from the end face with the cutting tool C or the like to flatten the end face is inserted into the disposition hole 33J of the housing 30J to abut thereon, and housed therein.

Figure 37B:
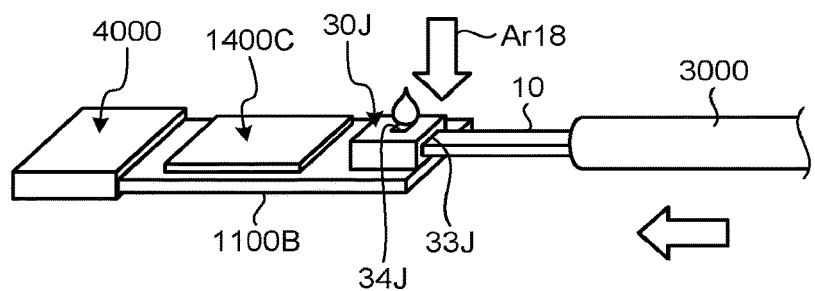
FIG. 37B is an explanatory diagram of a step subsequent to FIG. 37A of the assembly method for the active optical cable according to FIG. 36.

Subsequently, as indicated by arrow Ar18 in FIG. 37B, the instant adhesive 40 is dripped and supplied into the communication hole 34J to bond the multi optical transmission sheet 10 to the housing 30J. At this time, the instant adhesive 40 may pass through a gap between the multi optical transmission sheet 10 and an inner wall of the disposition hole 33J to flow to the opposite side of the communication hole 34J. Additionally, the electric wire 2000 is wired. Work in FIGS. 37A and 37B and wiring work for the electric wire 2000 are performed for both ends of the multi optical transmission sheet 10.

At the time of manufacturing the active optical cable 10000, complicated work is not required, the working time can be shortened, and convenience at a work site is high.

Specifically, in the active optical cable 10000, an assembly including the substrate 1100B and the electric connector 4000 is larger than the multi optical transmission sheet 10. Thus, at the work site, wiring can be performed in a space smaller than the assembly by wiring the multi optical transmission sheet 10 on which the covering 3000 is formed on a duct or the like thinner than the assembly to be taken into a room or a housing first, for example, and attaching the assembly to the multi optical transmission sheet 10 by simple work thereafter.

Sixteenth Embodiment

Figure 38:
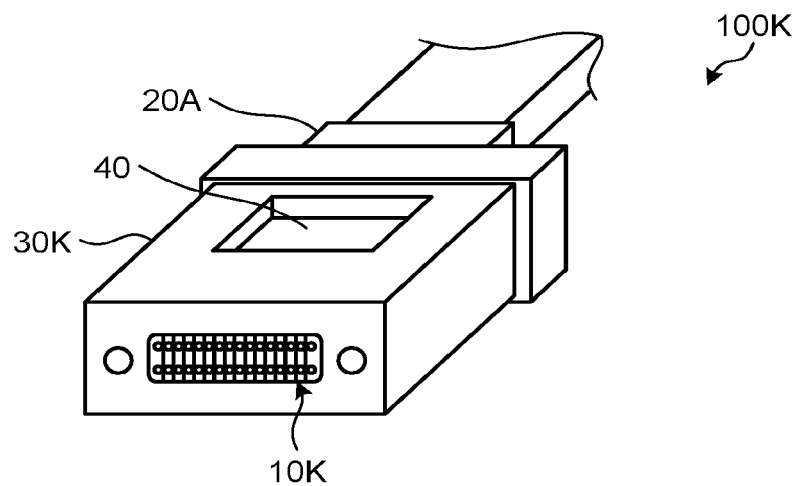
FIG. 38 is a schematic perspective view of a multi optical transmission sheet cable with a ferrule according to a sixteenth embodiment.

FIG. 38 is a schematic perspective view of a multi optical transmission sheet cable with a ferrule according to a sixteenth embodiment. A cable 100K as a multi optical transmission sheet cable with a ferrule includes 16 multi optical transmission sheets 10K, the boot 20A, a ferrule 30K, and the instant adhesive 40. The 16 multi optical transmission sheets 10K have a configuration having two rows including two cores. The ferrule 30K includes a disposition hole in which the 16 multi optical transmission sheets 10K are housed. The 16 multi optical transmission sheets 10K and the ferrule 30K are bonded and fixed to each other by the instant adhesive 40. The ferrule 30K may include a partition wall for partitioning among the 16 multi optical transmission sheets 10K, or does not necessarily include the partition wall. The disposition of the optical transmission regions in the 16 multi optical transmission sheets 10K are positioned by the ferrule 30K corresponding to disposition of the optical transmission regions 11 in the multi optical transmission sheet 10 in FIG. 1. Thus, the 16 multi optical transmission sheets 10K having two rows including two cores can be assumed to be the same as the multi optical transmission sheet 10 having two rows including 32 cores. When a connection structure is configured by the cable 100K and the cable 100 illustrated in FIG. 1, the numbers of the multi optical transmission sheets 10 and 10K included in the respective two cables 100 and 100K are different from each other. This connection structure has a branched configuration in which one is multi optical transmission sheet 10, and the other is the 16 multi optical transmission sheets 10K.

In the embodiments described above, the instant adhesive is used as a fixing means for fixing the batch-molding multi optical transmission sheet to the housing member, but an adhesive other than the instant adhesive may be used as the fixing means. The adhesive is not limited so long as the adhesive is made of material that does not melt the batch-molding multi optical transmission sheet and the housing member. The fixing means may be a mechanical fixing means. Examples thereof include a fixing means for fixing, which applies pressure or uses a locking mechanism. However, the mechanical fixing means is not limited thereto. By way of example, the following describes a seventeenth embodiment using a mechanical fixing means.

Seventeenth Embodiment

FIGS. 39A to 39E are explanatory diagrams of a multi optical transmission sheet cable with a ferrule according to the seventeenth embodiment. FIGS. 40A and 40B are explanatory diagrams of the multi optical transmission sheet cable with the ferrule according to the seventeenth embodiment. A cable 100L as the multi optical transmission sheet cable with the ferrule includes the multi optical transmission sheet 10 and a ferrule 30L.

Figure 39A:
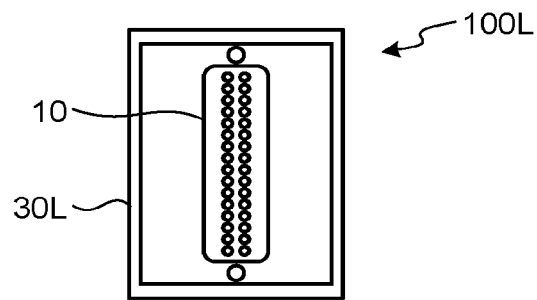
FIG. 39A is a front view of a multi optical transmission sheet cable with a ferrule according to a seventeenth embodiment.
Figure 39B:
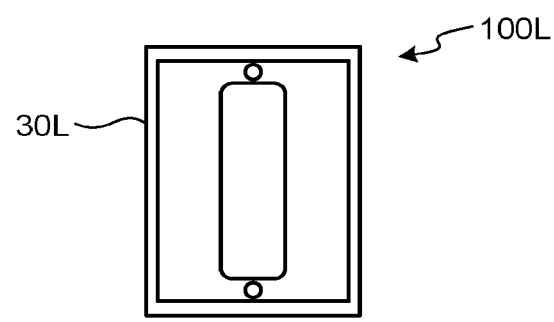
FIG. 39B is a front view of the ferrule of the multi optical transmission sheet cable with the ferrule according to the seventeenth embodiment.
Figure 39C:
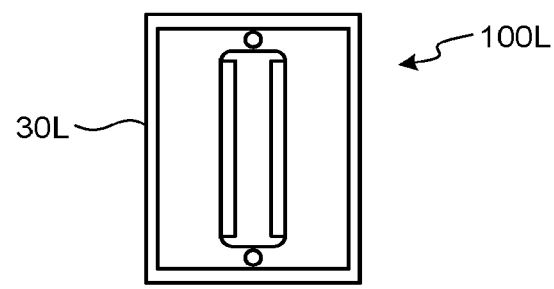
FIG. 39C is a back view of the ferrule of the multi optical transmission sheet cable with the ferrule according to the seventeenth embodiment.
Figure 39D:
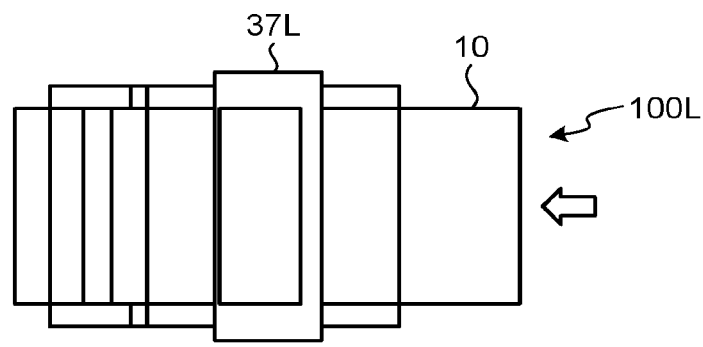
FIG. 39D is an explanatory diagram of one step of assembly of the multi optical transmission sheet cable with the ferrule according to the seventeenth embodiment.
Figure 39E:
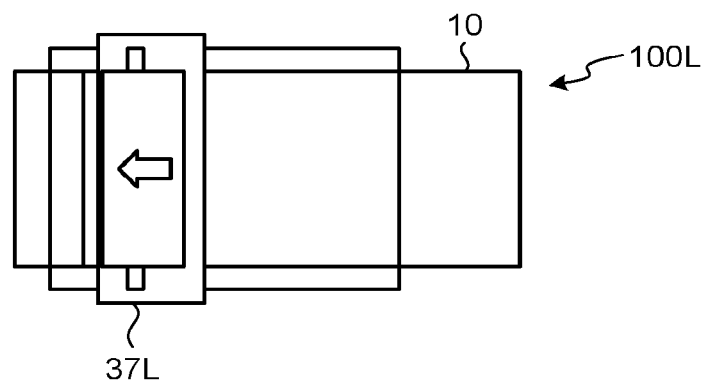
FIG. 39E is an explanatory diagram of a step subsequent to FIG. 39D of assembly of the multi optical transmission sheet cable with the ferrule according to the seventeenth embodiment.
Figure 40A:
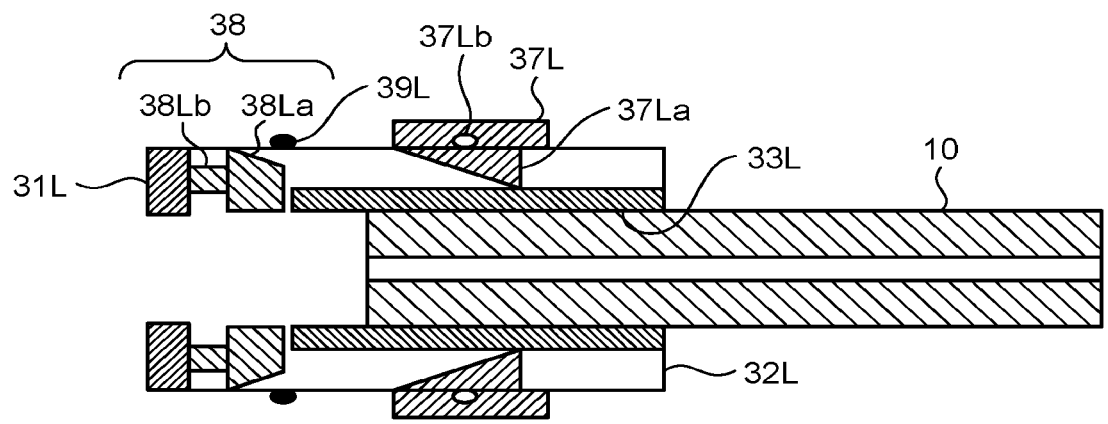
FIG. 40A is an explanatory diagram of one step of assembly of the multi optical transmission sheet cable with the ferrule according to the seventeenth embodiment.
Figure 40B:
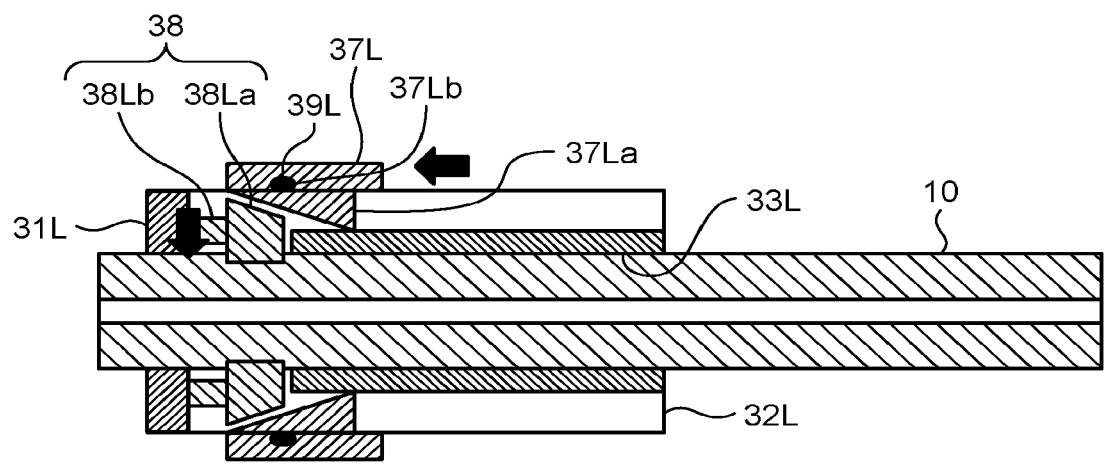
FIG. 40B is an explanatory diagram of a step subsequent to FIG. 40A of assembly of the multi optical transmission sheet cable with the ferrule according to the seventeenth embodiment.

FIG. 39A is a front view of the cable 100L, FIG. 39B is a front view of the ferrule 30L, FIG. 39C is a back view of the ferrule 30L, and FIGS. 39D and 39E are assembly explanatory diagrams of the cable 100L. FIGS. 40A and 40B are assembly explanatory diagrams of the cable 100L.

The ferrule 30L includes a front end surface 31L, a rear end surface 32L, a disposition hole 33L, a slide outer frame 37L for fixing as a constituent element of the fixing means, a fixing mechanism 38L as a constituent element of the fixing means, and an engagement projecting part 39L as a constituent element of the fixing means. The slide outer frame 37L for fixing includes an inclined part 37La and an engagement recessed part 37Lb. The fixing mechanism 38L includes a fixing part 38La and an elastic member 38Lb. One end of the elastic member 38Lb is fixed to an inner part on the front end surface 31L side of the ferrule 30, and the other end thereof is fixed to the fixing part 38La. The fixing part 38La and the elastic member 38Lb may be integrally formed.

At the time of assembling the cable 100L, the multi optical transmission sheet 10 is inserted into the disposition hole 33L from the rear end surface 32L of the ferrule 30L. A distal end surface of the multi optical transmission sheet 10 is caused to project from the front end surface 31L of the ferrule 30L.

Next, the slide outer frame 37L for fixing is slid from the rear end surface 32L side toward the front end surface 31L side. Accordingly, the inclined part 37La of the slide outer frame 37L for fixing presses the fixing part 38La against the multi optical transmission sheet 10. The fixing part 38La can be pressed against the multi optical transmission sheet 10 due to elasticity of the elastic member 38Lb. When the slide outer frame 37L for fixing is further slid, the fixing part 38La is pressed against the multi optical transmission sheet 10 more strongly due to a shape effect of the inclined part 37La. Additionally, the engagement projecting part 39L is fitted into the engagement recessed part 37Lb to be engaged with each other. Accordingly, the multi optical transmission sheet 10 is fixed to the ferrule 30L. Positions of the engagement projecting part 39L and the engagement recessed part 37Lb are adjusted so that the engagement projecting part 39L is fitted into the engagement recessed part 37Lb at a position at which the fixing part 38La is pressed against the multi optical transmission sheet 10 with appropriate pressure without giving an adverse effect to the multi optical transmission sheet 10. A distal end portion of the multi optical transmission sheet 10 projecting from the front end surface 31L of the ferrule 30L is cut off thereafter.

In the embodiments described above, the ferrule 30 is a ferrule interchangeable with the MT ferrule. However, the ferrule is not limited thereto. For example, the ferrule may be a ferrule interchangeable with a ferrule used for an MPO connector conforming to JIS C5982 standard or IEC61754-7 standard related to an F13 type multicore optical fiber connector, or may be a ferrule interchangeable with a ferrule used for a PMT connector conforming to JPCA-PE03-01-07S standard.

The optical transceiver in the embodiments described above may be an optical transceiver conforming to Centum gigabit Forum factor Pluggable (CFP), Centum eXtended capability Pluggable (CXP), Quad small Forum factor Pluggable (QSFP), Octal small Forum factor Pluggable (OSFP), or Consortium for OnBoard Optics (COBO).

The present invention is not limited to the embodiments described above. The present invention also encompasses a configuration obtained by appropriately combining the constituent elements described above. Effects and modifications can be further easily conceived by those skilled in the art. Accordingly, a wider aspect of the present invention is not limited to the embodiments described above, and can be variously modified.

REFERENCE SIGNS LIST 10, 10A, 10B, 10CA, 10CB, 10CC MULTI OPTICAL TRANSMISSION SHEET
10a, 10b PART
10c END FACE
11, 11A, 11B, 11a, 11b OPTICAL TRANSMISSION REGION
12, 12A, 12B COVERING PART
20, 20A, 20C BOOT
30, 30A, 30B, 30F, 30G, 30GA, 50C FERRULE
30H, 30I, 30J HOUSING
31, 31A, 31B, 31F, 31H, 31I, 31J, 51C FRONT END SURFACE
32, 32A, 32F, 32H, 32I, 32J, 52C REAR END SURFACE
33, 33A, 33F, 33G, 33GA, 33H, 33I, 33J DISPOSITION HOLE
33a, 33Aa1, 33Aa2, 33Fa FRONT END PART
33b, 33Ab, 33Fb, 53Cb REAR END PART
33c, 33Ac, 33Fc, 33Fd, 33Ha, 33Ia, 33Ja, 53Cc STEPPED PART
34, 34A, 34F, 34G, 34GA, 34H, 34I, 34J COMMUNICATION HOLE
35, 35A, 35B, 36, 36A, 36B, 55C, 56C GUIDE HOLE
37A, 37B PARTITION WALL
38F, 38I, 64A, 64B, 64C LENS ARRAY PART
38Fa, 63a FRAME PART
38Fb, 38Ia, 63b SUPPORTING PART
38Fc, 38Ib, 39Jb, 63c LENS ARRAY
39J PRISM WITH LENS ARRAY
39Ja PRISM
40 INSTANT ADHESIVE
53C GROOVE
53Ca BOTTOM SURFACE
54C LID
61 FILM
62 PROTECTING MEMBER
63 LENS ARRAY UNIT
64Aa, 64Ba, 64Ca LENS
71A, 71B, 71C, 71D CONNECTOR HOUSING
72Aa, 72Ab, 72B, 72C, 72D ELECTRIC CONTACT PIN
73Aa, 73Ab ELECTRIC WIRE
100, 100A, 100B, 100C, 100D, 100DA, 100E, 100F, 300, 301, 500, 600 CABLE
200, 200A, 200B, 200C CONNECTION STRUCTURE
400 RECEPTACLE
1000, 1000B, 1000C OPTICAL MODULE
1100, 1100B SUBSTRATE
1200 LIGHT EMITTING ELEMENT ARRAY
1300 LIGHT RECEIVING ELEMENT ARRAY
1400, 1400C ELECTRIC CIRCUIT
2000 ELECTRIC WIRE
3000 COVERING
4000 ELECTRIC CONNECTOR
10000 ACTIVE OPTICAL CABLE
C CUTTING TOOL
L1, L2 SIGNAL LIGHT

The invention claimed is:

1. A batch-molding multi optical transmission sheet assembly, comprising:
a batch-molding multi optical transmission sheet including
a sheet-like covering part made of plastic, and
a plurality of optical transmission regions, inside the sheet-like covering part, including a core region made of plastic that is disposed to extend along an extending direction of the sheet-like covering part and a clad region made of plastic that surrounds an outer circumference of the core region, the optical transmission regions being arranged in a line substantially parallel with each other along a principal surface of the sheet-like covering part;
a housing member including a disposition hole in which at least one end part of the batch-molding multi optical transmission sheet is housed;
a fixing means for fixing the batch-molding multi optical transmission sheet to the housing member; and
a lens array part that is disposed at an end face of the batch-molding multi optical transmission sheet, and includes a lens optically connected to each of a plurality of the core regions.

2. The batch-molding multi optical transmission sheet assembly according to claim 1, wherein the fixing means is an adhesive.

3. The batch-molding multi optical transmission sheet assembly according to claim 2, wherein
the housing member includes a communication hole communicating with the disposition hole, and
the adhesive is positioned at least in the communication hole.

4. The batch-molding multi optical transmission sheet assembly according to claim 1, wherein
the housing member includes a groove and a lid covering the groove, and
the disposition hole is defined by the groove and the lid.

5. The batch-molding multi optical transmission sheet assembly according to claim 1, wherein the housing member is a ferrule.

6. The batch-molding multi optical transmission sheet assembly according to claim 1, wherein the housing member and the lens array part are integrally formed.

7. The batch-molding multi optical transmission sheet assembly according to claim 1, further comprising a protecting member that protects an end face of the batch-molding multi optical transmission sheet.

8. The batch-molding multi optical transmission sheet assembly according to claim 1, further comprising a plurality of the batch-molding multi optical transmission sheets.

9. The batch-molding multi optical transmission sheet assembly according to claim 1, further comprising:
an electric contact pin; and
a housing that houses the electric contact pin and at least part of the housing member.

10. The batch-molding multi optical transmission sheet assembly according to claim 9, further comprising:
a plurality of the electric contact pins that are arranged in accordance with a predetermined standard, wherein
the batch-molding multi optical transmission sheet is disposed in an empty space of the housing in which the electric contact pins are not disposed.

11. The batch-molding multi optical transmission sheet assembly according to claim 10, wherein the predetermined standard is one of High Definition Multimedia Interface (HDMI), Universal Serial Bus (USB), DisplayPort, Ethernet, and THUNDERBOLT.

12. The batch-molding multi optical transmission sheet assembly according to claim 9, further comprising at least one electric wire connected to the electric contact pin.

13. An optical module, comprising:
- the batch-molding multi optical transmission sheet assembly according to claim 1; and
- a photoelectric element optically connected to the batch-molding multi optical transmission sheet.

14. An active optical cable, comprising:
- the optical module according to claim 13;
- an electric circuit electrically connected to the photoelectric element; and
- a connector electrically connected to the electric circuit.

15. A connection structure, comprising:
- two batch-molding multi optical transmission sheet assemblies according to claim 1, wherein
- the housing members of the two batch-molding multi optical transmission sheet assemblies are connected to each other.

16. The connection structure according to claim 15, further comprising a refractive index matching member interposed between the two batch-molding multi optical transmission sheet assemblies.

17. The connection structure according to claim 15, wherein numbers of the batch-molding multi optical transmission sheets included in the two batch-molding multi optical transmission sheet assemblies are different from each other.

* * * * *